(12) United States Patent
Biehl et al.

(10) Patent No.: US 12,456,270 B2
(45) Date of Patent: Oct. 28, 2025

(54) SYSTEMS AND METHODS OF PROVIDING VIRTUAL ACTIVITIES

(71) Applicant: Korro AI Limited, London (GB)

(72) Inventors: Robert Biehl, Darmstadt (DE); Arno Mittelbach, Rossdorf (DE); Markus Schlattmann, Griesheim (DE); Thomas Bader, Pfungstadt (DE)

(73) Assignee: KORRO AI LIMITED, London (GB)

( * ) Notice: Subject to any disclaimer, the term of this patent is extended or adjusted under 35 U.S.C. 154(b) by 144 days.

(21) Appl. No.: 18/549,422

(22) PCT Filed: Mar. 7, 2022

(86) PCT No.: PCT/IL2022/050248
§ 371 (c)(1),
(2) Date: Sep. 7, 2023

(87) PCT Pub. No.: WO2022/190085
PCT Pub. Date: Sep. 15, 2022

(65) Prior Publication Data
US 2024/0161427 A1 May 16, 2024

Related U.S. Application Data

(60) Provisional application No. 63/157,788, filed on Mar. 7, 2021.

(51) Int. Cl.
*G06T 19/00* (2011.01)
*A63F 13/56* (2014.01)
(Continued)

(52) U.S. Cl.
CPC ........... *G06T 19/006* (2013.01); *A63F 13/56* (2014.09); *A63F 13/577* (2014.09); *G06T 19/20* (2013.01); *G06T 2219/2004* (2013.01)

(58) Field of Classification Search
CPC ....... G06T 19/006; G06T 19/20; A63F 13/56; A63F 13/577
(Continued)

(56) References Cited

U.S. PATENT DOCUMENTS

2002/0084974 A1 7/2002 Ohshima et al.
2005/0288078 A1 12/2005 Cheok et al.
(Continued)

FOREIGN PATENT DOCUMENTS

| CN | 107137927 A | 9/2017 |
|---|---|---|
| WO | 2021/038565 A1 | 3/2021 |
| WO | 2021/171280 A1 | 9/2021 |

OTHER PUBLICATIONS

Wikipedia, Pinhole camera model, https://en.wikipedia.org/w/index.php?title=Pinhole_camera_model&oldid=1028923582, Jan. 25, 2022, pp. 1-4.

*Primary Examiner* — Thomas J Lett
(74) *Attorney, Agent, or Firm* — FisherBroyles, LLP; Roger L. Browdy; Ronni S. Jillions

(57) ABSTRACT

Systems and methods enable providing various virtual activities. One of the methods comprises obtaining images of a physical area acquired by an imaging device, generating a virtual activity world representative of the physical area, the generating comprising using at least part of the images to map physical elements of a plurality of physical elements, to the virtual activity world, wherein the physical elements include a given physical element movable by the user, and adding one or more virtual objects to the virtual activity world, using the virtual activity world to detect an interaction between the given physical element mapped to the virtual activity world, and a given virtual object, responsive to a detected interaction, determining an outcome of the interaction, applying a change in the virtual activity world (Continued)

corresponding to the outcome, and displaying a representation of the virtual activity world on a display device.

20 Claims, 25 Drawing Sheets

(51) Int. Cl.
    *A63F 13/577*     (2014.01)
    *G06T 19/20*     (2011.01)
(58) Field of Classification Search
    USPC .......................................................... 345/633
    See application file for complete search history.

(56) References Cited

U.S. PATENT DOCUMENTS

| | | |
|---|---|---|
| 2019/0178654 A1 | 6/2019 | Hare |
| 2020/0271450 A1* | 8/2020 | Gorur Sheshagiri ... G06F 1/163 |
| 2020/0368616 A1 | 11/2020 | Delamont |
| 2022/0292543 A1* | 9/2022 | Henderson ......... G06Q 30/0252 |

* cited by examiner

SYSTEMS AND METHODS OF PROVIDING VIRTUAL ACTIVITIES

TECHNICAL FIELD

The presently disclosed subject matter is related to the field of interactive activities (e.g., gaming) which use computer vision and augmented reality.

BACKGROUND

Interactive augmented reality (AR) enables a user to perform interactive activities (e.g., games) involving both the real world and virtual elements.

WO 2021/038565 and WO 2021/171280 of the Applicant (content of these patent applications is incorporated by reference herein in its entirety) are references considered to be relevant as background to the presently disclosed subject matter (acknowledgement of these references herein is not to be inferred as meaning that it is in any way relevant to the patentability of the presently disclosed subject matter).

There exists a need to propose new systems and methods for performing interactive activities which rely on augmented reality.

GENERAL DESCRIPTION

In accordance with certain aspects of the presently disclosed subject matter, there is provided a method comprising, by a processing circuitry operatively coupled to at least one imaging device, obtaining images of a physical area acquired by the imaging device, wherein the physical area comprises a plurality of physical elements, wherein at least one given physical element of the plurality of physical elements is movable by a user performing an activity within the physical area, generating a virtual activity world representative of the physical area, the generating comprising: using at least part of the images to map physical elements of the plurality of physical elements, to the virtual activity world, wherein the physical elements include the given physical element, and adding one or more virtual objects to the virtual activity world, using the virtual activity world to detect an interaction between the given physical element mapped to the virtual activity world, and a given virtual object, responsive to a detected interaction, determining an outcome of the interaction, and applying a change in the virtual activity world corresponding to the outcome, and displaying a representation of the virtual activity world on a display device.

In addition to the above features, the method according to this aspect of the presently disclosed subject matter can optionally comprise one or more of features (i) to (xxxiii) below, in any technically possible combination or permutation:

i. the imaging device or a system comprising the imaging device is held by the user, or worn by the user, or attached to the user;

ii. the given physical element is mapped to a virtual counterpart element in the virtual activity world, wherein the method comprises determining a change of a position of the given physical element in the physical area, and applying a corresponding change in a position of the virtual counterpart element in the virtual activity world;

iii. the method comprises displaying the virtual counterpart element as overlaying at least part of (or most of, or all of) the given physical element in the images;

iv. the method comprises generating the virtual counterpart element with one or more features which differ from one or more corresponding features of the given physical element;

v. the method comprises generating a feature of the virtual counterpart element which differs from a feature of the given physical element;

vi. the method comprises changing a feature of the virtual counterpart element depending on an activity to be performed by the user with the given physical element;

vii. the method comprises changing a feature of the virtual counterpart element depending on a level of difficulty of an activity to be performed by the user with the given physical element;

viii. the method comprises generating a feature of the virtual counterpart element which differs from a feature of the given physical element to change a level of difficulty of an activity in which the user is required to make the virtual counterpart element avoid colliding with one or more virtual objects of the virtual activity world;

ix. the method comprises generating a feature of the virtual counterpart element which differs from a feature of the given physical element to change a level of difficulty of an activity in which the user is required to make the virtual counterpart element collide with one or more virtual objects of the virtual activity world;

x. the feature is a size;

xi. the method comprises providing an activity in which the user is required to move the given physical element in the physical area, such that the given physical element mapped to the virtual activity world collides with one or more virtual objects of the virtual activity world and detecting whether the given physical element mapped to the virtual activity world collides with the one or more virtual objects of the virtual activity world.

xii. the method comprises providing an activity in which the user is required to move the given physical element in the physical area, such that the given physical element mapped to the virtual activity world avoids colliding with one or more virtual objects of the virtual activity world, and detecting whether the given physical element mapped to the virtual activity world collides with the one or more virtual objects of the virtual activity world;

xiii. the method comprises mapping the given physical element to a virtual counterpart element in the virtual activity world, wherein the virtual counterpart element has a feature which differs from an actual feature of the given physical element, and detecting whether the given physical element mapped to the virtual activity world collides with one or more virtual objects of the virtual activity world based on the feature of the virtual counterpart element;

xiv. the method comprises generating one or more virtual boundaries in the virtual activity world, defining one or more boundaries in which the user performs the activity;

xv. the method comprises using at least part of the images to identify one or more characteristics of the physical element moved by the user in the physical area, and providing the user with a given activity according to the one or more characteristics of the physical element moved by the user, the providing including generating a virtual activity world which enables the user to perform the given activity; using at least part of the images to map a surface of a physical element of the physical area to the virtual activity world, adding to the virtual activity world one or more virtual objects overlaying the surface in the virtual activity world, using the virtual activity world to detect an interaction between the given physical element mapped to the virtual activity world, and a given virtual object overlaying the surface in the virtual activity world, responsive to a detected interaction, determining an outcome of the interaction, and applying a change in the virtual activity world corresponding to the outcome, and displaying a representation of the virtual activity world on the display device;

xvi. the surface of the physical element is a surface of a ground of the physical area, wherein the given physical element is moved by the user on the surface of the ground of the physical area, wherein the method comprises detecting whether the given physical element mapped to the virtual activity world collides with one or more given virtual objects overlaying the surface of the ground in the virtual activity world;

xvii. the surface of the physical element is a surface of a ground of the physical area, wherein the given physical element is moved by the user on the surface of the ground of the physical area, wherein the method comprises detecting whether the given physical element mapped to the virtual activity world collides with one or more virtual objects moving towards a position of the imaging device or of the user in the virtual activity world;

xviii. the surface of the physical element is a surface of a physical obstacle of the physical area.

xix. the method comprises detecting whether an initial position of the given physical element in the physical area is located within an authorized area, or detecting whether an initial position of the user in the physical area is located within an authorized area, and determining that an interaction between the given physical element mapped to the virtual activity world and one or more virtual objects is valid under a condition that the initial position of the given physical element is within the authorized area, or under a condition that the initial position of the user in the physical area is located within an authorized area;

xx. the method comprises determining whether the given physical element has a motion in the physical area which meets a criterion, and determining that an interaction between the given physical element mapped to the virtual activity world and one or more virtual objects is valid under a condition that the given physical element has a motion which meets the criterion;

xxi. the method comprises, responsive to a detection of a collision between the given physical element mapped to the virtual activity world, and one or more given virtual objects overlaying the surface of the physical obstacle in the virtual activity world, performing at least one of (a) or (b) or (c): (a) generating a motion of one or more virtual objects different from the one or more given virtual objects in the virtual activity world; (b) making the one or more given virtual objects disappear from the virtual activity world; (c) adding to the virtual activity world one or more new virtual objects;

xxii. the method comprises, responsive to a detection of a collision between the given physical element mapped to the virtual activity world, and one or more given virtual objects overlaying the surface of the physical obstacle in the virtual activity world, performing at least one of (a) or (b): (a) generating a motion of one or more virtual objects located above the given virtual objects, wherein the virtual objects appear as falling towards the ground of the physical area; (b) adding to the virtual activity world one or more new virtual objects which appear as falling from the top of the images;

xxiii. the method comprises, responsive to detection of a collision between the given physical element and the surface of the physical obstacle at a given area, performing at least one of (a) or (b) or (c): (a) inducing a motion of one or more given virtual objects to overlay the given area of the wall in the virtual activity world; (b) making a virtual object collided by the given physical element to generate an effect; (c) making a virtual object collided by the given physical element to generate an effect which modifies one or more different virtual objects in the virtual activity world;

xxiv. the method comprising, responsive to a detection of a collision between the given physical element mapped to the virtual activity world, and a predefined target area of the surface of the physical obstacle mapped to the virtual activity world, generating at least one new virtual object in the virtual activity world;

xxv. the method comprises generating a first coordinate system of the virtual activity world, wherein the given physical element is mapped to the first coordinate system, generating at least one second coordinate system of the virtual activity world, wherein the at least one second coordinate system is a moveable coordinate system with respect to the first coordinate system, or the first coordinate system is a moveable coordinate system with respect to the at least one second coordinate system, generating a relative motion between the at least one second coordinate system and the first coordinate system to move virtual elements associated with the at least one second coordinate system with respect to the first coordinate system;

xxvi. the method comprises defining an active area on a portion of the virtual activity world, wherein a size of the active area is limited by a size of the physical area, wherein the active area comprises an edge area, wherein at least one given virtual object of the virtual activity world is located outside of the active area, thereby being inaccessible for interaction by the user, responsive to a detection of an interaction of the user with the edge area, moving the given virtual object into the active area, thereby rendering the given virtual object accessible for an interaction by the user;

xxvii. the method comprises defining an active area on a portion of the virtual activity world, wherein a size of the active area is limited by a size of the physical area, wherein the active area comprises an edge area, wherein at least one given virtual object of the virtual activity world is located outside of the active area, thereby being inaccessible for interaction by a user, responsive to a detection of an interaction of the user with the edge area, moving the active area to a new position relative to the virtual activity world, wherein, at this new position of the active area, the given virtual object is located within the active area, thereby rendering the given virtual object accessible for an interaction by the user;

xxviii. the method comprises defining an active area on a portion of the virtual activity world, wherein a size of the active area is limited by a size of the physical area, wherein at least one given virtual object of the virtual activity world is located outside of the active area, thereby being inaccessible for interaction by a user, responsive to a received input, shrinking at least part of the virtual activity world to allow the least one virtual object to be included in the active area, thereby rendering the given virtual object accessible for an interaction by the user;

xxix. the method comprises further expanding at least part of the virtual activity world after its shrinking;

xxx. the method comprises shrinking the virtual activity world around a first pivot location, wherein the method comprises, following said shrinking, enabling selection of a second pivot location different from the first pivot location, and expanding the virtual activity world around the second pivot location, thereby shifting the relative position of the active area with respect to the virtual activity world;

xxxi. the method comprises determining a two-dimensional position of a physical element in the images, and using an estimate of a size of the given physical element and parameters of the imaging device to estimate a three-dimensional position of the physical element in the physical scene;

xxxii. the method comprises, for a physical element lying on a ground of the physical scene: determining a two-dimensional position of the physical element in the images, using the two-dimensional position, parameters of the imaging device, and a position of the ground to estimate a three-dimensional position of the physical element in the physical scene; and xxxiii. the method comprises detecting dynamics of the physical element in the physical area.

According to another aspect of the presently disclosed subject matter there is provided a non-transitory storage device readable by a machine, tangibly embodying a program of instructions executable by the machine to perform the method described above. In addition to the above features, the non-transitory storage device according to this aspect of the presently disclosed subject matter can optionally perform a method comprising one or more of features (i) to (xxxiii) above, in any technically possible combination or permutation.

According to another aspect of the presently disclosed subject matter there is provided a method comprising, by a processing circuitry operatively coupled to at least one imaging device: obtaining images of a physical area acquired by the imaging device, wherein the physical area enables a user to perform an activity involving moving of at least one given physical element, generating a virtual activity world representative of the physical area, the generating comprising: using at least part of the images to map the given physical element to the virtual activity world, using at least part of the images to map a surface of a physical element of the physical area to the virtual activity world, adding to the virtual activity world one or more virtual objects which overlay the surface in the virtual activity world, using the virtual activity world to detect an interaction between the given physical element mapped to the virtual activity world, and a given virtual object overlaying the surface in the virtual activity world, responsive to a detected interaction, determining an outcome of the interaction, and applying a change in the virtual activity world corresponding to the outcome, and displaying a representation of the virtual activity world on a display device.

In addition to the above features, the method according to this aspect of the presently disclosed subject matter can optionally comprise one or more of features (xxxiv) to (xlii) below, in any technically possible combination or permutation:

xxxiv. the method comprises at least one of (a) or (b): (a) providing an activity in which the user is required to move the given physical element in the physical area, such that the given physical element mapped to the virtual activity world avoids colliding with one or more virtual objects of the virtual activity world, and detecting whether the given physical element mapped to the virtual activity world collides with the one or more virtual objects of the virtual activity world, (b) providing an activity in which the user is required to move the given physical element in the physical area, such that the given physical element mapped to the virtual activity world collides with one or more virtual objects of the virtual activity world, and detecting whether the given physical element mapped to the virtual activity world collides with the one or more virtual objects of the virtual activity world;

xxxv. the surface of the physical element is a surface of a ground of the physical area, wherein the method comprises providing an activity in which a user is required to move the given physical element on the ground of the physical area, while avoiding collision of the given physical element mapped to the virtual activity world with one or more mobile virtual obstacles moving over the ground in the virtual activity world, wherein the one or more virtual obstacles move towards a position of the imaging device or of the user in the virtual activity world, and detecting whether the given physical element mapped to the virtual activity world collides with one or more virtual objects moving towards a position of the imaging device or of the user in the virtual activity world;

xxxvi. the surface of the physical element is a surface of a physical obstacle of the physical area;

xxxvii. the method comprises detecting whether an initial position of the given physical element in the physical area is located within an authorized area, or detecting whether an initial position of the user in the physical area is located within an authorized area, and determining that an interaction between the given physical element mapped to the virtual activity world and one or more virtual objects is valid under a condition that the initial position of the given physical element is within the authorized area, or under a condition that the initial position of the user in the physical area is located within an authorized area;

xxxviii. the method comprises determining whether the given physical element has a motion in the physical area which meets a criterion, and determining that an interaction between the given physical element mapped to the virtual activity world and one or more virtual objects is valid under a condition that the given physical element has a motion which meets the criterion;

xxxix. the method comprises, responsive to detection of a collision between the given physical element mapped to the virtual activity world and one or more given virtual objects overlaying the surface of the physical obstacle in the virtual activity world, performing at least one of (a) or (b) or (c): (a) generating a motion of one or more virtual objects different from the one or more given virtual objects in the virtual activity world; (b) making the one or more given virtual objects disappear from the virtual activity world; (c) adding to the virtual activity world one or more new virtual objects;

xl. the method comprises, responsive to a detection of a collision between the given physical element mapped to the virtual activity world, and one or more given virtual objects overlaying the surface of the physical obstacle in the virtual activity world, performing at least one of (a) or (b): (a) generating a motion of one or more virtual objects located above the given virtual objects, wherein the virtual objects appear as falling towards the ground of the physical area; (b) adding to the virtual activity world one or more new virtual objects which appear as falling from the top of the images;

xli. the method comprises, responsive to detection of a collision between the given physical element and a surface of the physical obstacle at a given area, performing at least one of (a) or (b) or (c): (a) inducing a motion of one or more given virtual objects to overlay the given area of the wall in the virtual activity world; (b) making a virtual object collided by the given physical element to generate an effect; (c) making a virtual object collided by the given physical element to generate an effect which modifies one or more different virtual objects in the virtual activity world;

xlii. the method comprises, responsive to a detection of a collision between the given physical element mapped to the virtual activity world, and a predefined target area of the surface of the physical obstacle mapped to the virtual activity world, generating at least one new virtual object in the virtual activity world.

According to another aspect of the presently disclosed subject matter there is provided a non-transitory storage device readable by a machine, tangibly embodying a program of instructions executable by the machine to perform the method described above. In addition to the above features, the non-transitory storage device according to this aspect of the presently disclosed subject matter can optionally perform a method comprising one or more of features (xxxiv) to (xlii) above, in any technically possible combination or permutation.

According to another aspect of the presently disclosed subject matter there is provided a method comprising, by a processing circuitry operatively coupled to at least one imaging device: obtaining images of a physical area acquired by the imaging device, wherein the physical area comprises a plurality of physical elements, wherein at least one given physical element of the plurality of physical elements is movable by a user performing an activity within the physical area, generating a virtual activity world representative of the physical area, the generating comprising: generating a first coordinate system of the virtual activity world, generating at least one second coordinate system of the virtual activity world, wherein the at least one second coordinate system is a moveable coordinate system with respect to the first coordinate system, or the first coordinate system is a moveable coordinate system with respect to the at least one second coordinate system; using at least part of the images to map the given physical element to the first coordinate system of the virtual activity world, associating one or more virtual elements with the at least one second coordinate system, generating a relative motion between the at least one second coordinate system and the first coordinate system to move virtual elements associated with the at least one second coordinate system with respect to the first coordinate system, and displaying a representation of the virtual activity world on a display device.

In addition to the above features, the method according to this aspect of the presently disclosed subject matter can optionally comprise one or more of features (xliii) to (xliv) below, in any technically possible combination or permutation:

xliii. the method comprises changing parameters of a motion of the second coordinate system or of the first coordinate system based on a position of the given physical element in the physical area;

xliv. the first coordinate system is a static coordinate system, and the at least one second coordinate system is a dynamic coordinate system, the method comprising associating virtual objects to the first coordinate system and to the at least one second coordinate system, wherein virtual objects associated with the first coordinate system are static relative to the virtual activity world, and wherein virtual objects associated with the at least one second coordinate system are mobile with respect to the first coordinate system, wherein the method comprise moving the at least one second coordinate system relative to the first coordinate system.

According to another aspect of the presently disclosed subject matter there is provided a non-transitory storage device readable by a machine, tangibly embodying a program of instructions executable by the machine to perform the method described above. In addition to the above features, the non-transitory storage device according to this aspect of the presently disclosed subject matter can optionally perform a method comprising one or more of features (xliii) to (xliv) above, in any technically possible combination or permutation.

According to another aspect of the presently disclosed subject matter there is provided a method comprising, by a processing circuitry operatively coupled to at least one imaging device: obtaining images of a physical area acquired by the imaging device, wherein the physical area comprises a plurality of physical elements, wherein at least one given physical element of the plurality of physical elements is movable by a user performing an activity within the physical area, generating a virtual activity world informative of the physical area, the generating comprising: using at least part of the images to map physical elements of the plurality of physical elements, to the virtual activity world, wherein the physical elements include the given physical element, and adding one or more virtual objects to the virtual activity world, defining an active area on a portion of the virtual activity world, wherein a size of the active area is limited by a size of the physical area, wherein at least one given virtual object of the virtual activity world is located outside of the active area, thereby being inaccessible for interaction by a user, responsive to a received input, shrinking at least part of the virtual activity world to allow the at least one virtual object to be included in the active area, thereby rendering the given virtual object accessible for an interaction by the user.

In addition to the above features, the method according to this aspect of the presently disclosed subject matter can optionally comprise one or more of features (xlv) to (xlviii) below, in any technically possible combination or permutation:

xlv. the method comprises, responsive to a received input, expanding at least part of the virtual activity world after its shrinking;

xlvi. the method comprises disabling interactions with virtual objects during at least one of shrinking or expanding of the virtual activity world;

xlvii. the method comprises shrinking the virtual activity world around a first pivot location, wherein the method comprises, following said shrinking, enabling selection of a second pivot location different from the first pivot location, and expanding the virtual activity world around the second pivot location, thereby shifting the relative position of the active area with respect to the virtual activity world; and xlviii. the method comprises enabling a user to select the second pivot location.

According to another aspect of the presently disclosed subject matter there is provided a non-transitory storage device readable by a machine, tangibly embodying a program of instructions executable by the machine to perform the method described above. In addition to the above features, the non-transitory storage device according to this aspect of the presently disclosed subject matter can optionally perform a method comprising one or more of features (xlv) to (xlviii) above, in any technically possible combination or permutation.

According to another aspect of the presently disclosed subject matter there is provided a system comprising a processing circuitry operatively coupled to at least one imaging device, the processing circuitry being operative to: obtain images of a physical area acquired by the imaging device, wherein the physical area comprises a plurality of physical elements, wherein at least one given physical element of the plurality of physical elements is movable by a user performing an activity within the physical area, generate a virtual activity world representative of the physical area, the generating comprising: using at least part of the images to map physical elements of the plurality of physical elements, to the virtual activity world, wherein the physical elements include the given physical element, and adding one or more virtual objects to the virtual activity world, use the virtual activity world to detect an interaction between the given physical element mapped to the virtual activity world, and a given virtual object, responsive to a detected interaction, determine an outcome of the interaction, and apply a change in the virtual activity world corresponding to the outcome, and display a representation of the virtual activity world on a display device.

In addition to the above features, the system according to this aspect of the presently disclosed subject matter can optionally be configured to perform operations in accordance with one or more of features (i) to (xxxiii) above, in any technically possible combination or permutation.

According to another aspect of the presently disclosed subject matter there is provided a system comprising a processing circuitry operatively coupled to at least one imaging device, the processing circuitry being operative to: obtain images of a physical area acquired by the imaging device, wherein the physical area enables a user to perform an activity involving moving of at least one given physical element, generate a virtual activity world representative of the physical area, the generating comprising: using at least part of the images to map the given physical element to the virtual activity world, using at least part of the images to map a surface of a physical element of the physical area to the virtual activity world, adding to the virtual activity world one or more virtual objects which overlay the surface in the virtual activity world, use the virtual activity world to detect an interaction between: the given physical element mapped to the virtual activity world, and a given virtual object overlaying the surface in the virtual activity world, responsive to a detected interaction, determine an outcome of the interaction, and apply a change in the virtual activity world corresponding to the outcome, and display a representation of the virtual activity world on a display device.

In addition to the above features, the system according to this aspect of the presently disclosed subject matter can optionally be configured to perform comprise one or more operations in accordance with features (xxxiv) to (xlii) above, in any technically possible combination or permutation.

According to another aspect of the presently disclosed subject matter there is provided a system comprising a processing circuitry operatively coupled to at least one imaging device, the processing circuitry being operative to: obtain images of a physical area acquired by the imaging device, wherein the physical area comprises a plurality of physical elements, wherein at least one given physical element is movable by a user performing an activity within the physical area, generate a virtual activity world representative of the physical area, the generating comprising: generate a first coordinate system of the virtual activity world, generate at least one second coordinate system of the virtual activity world, wherein the at least one second coordinate system is a moveable coordinate system with respect to the first coordinate system, or the first coordinate system is a moveable coordinate system with respect to the at least one second coordinate system; use at least part of the images to map the given physical element to the first coordinate system of the virtual activity world, associate one or more virtual elements with the at least one second coordinate system, generate a relative motion between the at least one second coordinate system and the first coordinate system to move virtual elements associated with the at least one second coordinate system with respect to the first coordinate system, and display a representation of the virtual activity world on a display device.

In addition to the above features, the system according to this aspect of the presently disclosed subject matter can optionally be configured to perform one or more operations in accordance with features (xliii) to (xliv) above, in any technically possible combination or permutation.

According to another aspect of the presently disclosed subject matter there is provided a system comprising a processing circuitry operatively coupled to at least one imaging device, the processing circuitry being operative to: obtain images of a physical area acquired by the imaging device, wherein the physical area comprises a plurality of physical elements, wherein at least one given physical element of the plurality of physical elements is movable by a user performing an activity within the physical area, generate a virtual activity world informative of the physical area, the generating comprising: using at least part of the images to map physical elements of the plurality of physical elements, to the virtual activity world, wherein the physical elements include the given physical element, and adding one or more virtual objects to the virtual activity world, defining an active area on a portion of the virtual activity world, wherein a size of the active area is limited by a size of the physical area, wherein at least one given virtual object of the virtual activity world is located outside of the active area, thereby being inaccessible for interaction by a user, responsive to a received input, shrinking at least part of the virtual activity world to allow the at least one virtual object to be included in the active area, thereby rendering the given virtual object accessible for an interaction by the user.

In addition to the above features, the system according to this aspect of the presently disclosed subject matter can optionally be configured to perform one or more operations in accordance with features (xlv) to (xlviii) above, in any technically possible combination or permutation.

According to some embodiments, the proposed solution allows determining, in real time, or quasi real time, interactions performed by a user between a physical object manipulated by the user in a physical area and one or more virtual objects overlaid on images of the physical area, as if they were located within the physical area.

According to some embodiments, the proposed solution provides the user with an interactive augmented reality experience, in which the user carries an imaging device (the user may e.g., hold and/or wear the imaging device and/or the imaging device can be attached to the user) to acquire images of a physical area in which he can manipulate one or more physical objects, while viewing virtual elements overlaid on the images.

According to some embodiments, the proposed solution provides various interactive game experiences, which can involve interactions with planar surfaces of the physical area, such as physical obstacles (e.g., walls) and/or the ground.

According to some embodiments, the proposed solution provides interactive activities in which mobile virtual elements are displayed.

According to some embodiments, the proposed solution overcomes physical limitations imposed by the size of the physical area (e.g., a room) in which the user is located, thereby providing to the user an experience in which he can move within a virtual activity world of greater size than the physical area.

According to some embodiments, the proposed solution solves the balancing problem between skilled and less skilled users by dynamically adapting the activity (e.g., game/exercise).

BRIEF DESCRIPTION OF THE DRAWINGS

In order to understand the invention and to see how it can be carried out in practice, embodiments will be described, by way of non-limiting examples, with reference to the accompanying drawings.

DETAILED DESCRIPTION

Figure 1:
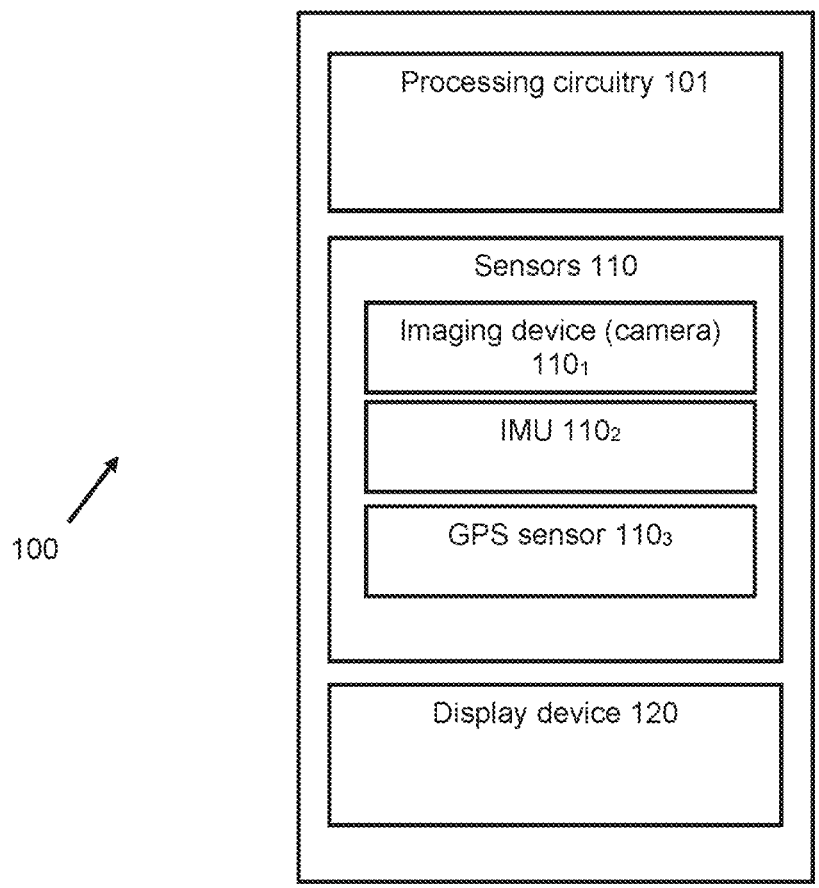
FIG. 1 illustrates a generalized block diagram of a computerized device in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

The terms "computer", "computer device", "computerized device" should be expansively construed to include any kind of hardware-based electronic device with a data processing circuitry (e.g., digital signal processor (DSP), a GPU, a TPU, a field programmable gate array (FPGA), an application specific integrated circuit (ASIC), microcontroller, microprocessor etc.). The processing circuitry can comprise, for example, one or more processors operatively connected to computer memory, loaded with executable instructions for executing operations, as further described below. The processing circuitry encompasses a single processor or multiple processors, which may be located in the same geographical zone or may, at least partially, be located in different zones, and may be able to communicate together.

The presently disclosed subject matter contemplates various methods as disclosed herein and respective processing circuitries (e.g., integrated in the computerized device) which are configured to perform these methods.

The presently disclosed subject matter further contemplates one or more computer readable storage mediums having data stored therein representing software executable by a computer, the software including instructions for performing one or more of the methods disclosed herein.

Unless specifically stated otherwise, as apparent from the following discussions, it is appreciated that throughout the specification discussions utilizing terms such as "obtaining", "generating", "using", "adding", "determining", "displaying", "modifying", "applying", "changing", "detecting", "providing" or the like, refer to the action(s) and/or process(es) of a computer that manipulates and/or transforms data into other data, said data represented as physical, such as electronic, quantities and/or said data representing the physical objects.

The terms "non-transitory memory" and "non-transitory storage medium" used herein should be expansively construed to cover any volatile or non-volatile computer memory suitable to the presently disclosed subject matter.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The operations in accordance with the teachings herein may be performed by a computer specially constructed for the desired purposes or by a general-purpose computer specially configured for the desired purpose by a computer program stored in a non-transitory computer-readable storage medium.

It is noted that while some examples in the following description used for describing various principles of the presently disclosed subject matter refer to a ball game, this is done by way of example only and should not be construed as limiting, as these principles can be likewise applied to other types of activities and other types of objects.

Attention is drawn to FIG. 1 which illustrates a functional block diagram of a device 100 (computerized device 100).

The device 100 includes a processing circuitry 101, operatively connected to one or more sensors 110. One or more of the sensors 110 are embedded in the device 100. Some of the sensors 110 may be external to the device 100.

Sensors 100 include an imaging device (e.g., a camera) $110_1$. According to some embodiments, sensors 100 can include a GPS sensor $110_3$, one or more accelerometers, one or more gyroscopes, one or more microphones, etc. According to some embodiments, sensors 100 can include an Inertial Measurement Unit (IMU) $110_2$. The IMU $110_2$ can include the accelerometers, gyroscopes and possibly also one or more magnetometers.

The processing circuitry 101 is configured to provide the processing necessary for executing operations as further disclosed in the various methods herein below. The processing circuitry 101 comprises or is otherwise operatively connected to one or more computer processors (not shown separately) and can also comprise computer memory (not shown separately).

The processing circuitry 101 is also operatively connected to a display device 120 (e.g., a screen) of the device 100. In some embodiments, the processing circuitry 101 can be operatively connected to a display device (e.g., a TV screen) which is external to the computerized device 100.

According to some embodiments, the computerized device 100 is e.g., a smartphone, a laptop, or an augmented reality (AR) headset.

The computerized device 100 enables a user to perform one or more interactive activities (such as, but not limited to, games). In some embodiments, the computerized device 100 is a device which can be handled or worn by the user (or attached to the user) during the interactive activities performed by the user.

The interactive activities combine both images of a physical area (acquired e.g., by the imaging device $110_1$ of the computerized device 100) in which a user is performing an activity, and virtual objects artificially inserted in the images (using a computerized method). The virtual objects can be e.g., superimposed/overlaid on the images acquired by the imaging device $110_1$, using image processing techniques.

The physical area corresponds for example to a room including one or more physical boundaries, such as walls (this is however not limitative).

The interactions between the user and the virtual object(s) within the physical area are monitored. Since the virtual objects are artificially inserted in the images of the physical area, this provides a feeling to the user (who views the processed images on a display device) that these virtual object(s) are physically located in the physical area.

A feedback (e.g., real time feedback) about the skills and performance of a user performing a certain activity is provided. As explained hereinafter, the activity can require the user to move a physical element (e.g., a ball and/or a body part of the user) within the physical area, in order to trigger interaction with one or more virtual objects in accordance with the rules of the proposed activity.

As explained hereinafter, the computerized device can be used to lay out the physical area in which the activity is performed and monitored. In addition, it can enable showing the captured images (video images) overlaid with additional virtual elements that are placed and aligned with the tracked physical area.

According to some embodiments, it is possible to generate virtual boundaries (e.g. virtual walls or other markers) which define the boundaries of the virtual activity world, and are displayed to the user.

In some embodiments, a given imaging device can acquire images of activities performed by at least two users in the same physical area. Each user can view a different virtual activity world displayed on a different display device and performs his own activity by interacting with the virtual activity word displayed on his display device. The physical objects moved by the first user can be recognized and differentiated from the physical objects moved by the second user using e.g. image recognition algorithms (see below that it is possible to provide a different activity depending on characteristics of the physical object moved by each user— during a registration phase, each user can be associated with the characteristics of his physical object, thereby enabling later recognition).

Figure 2A:
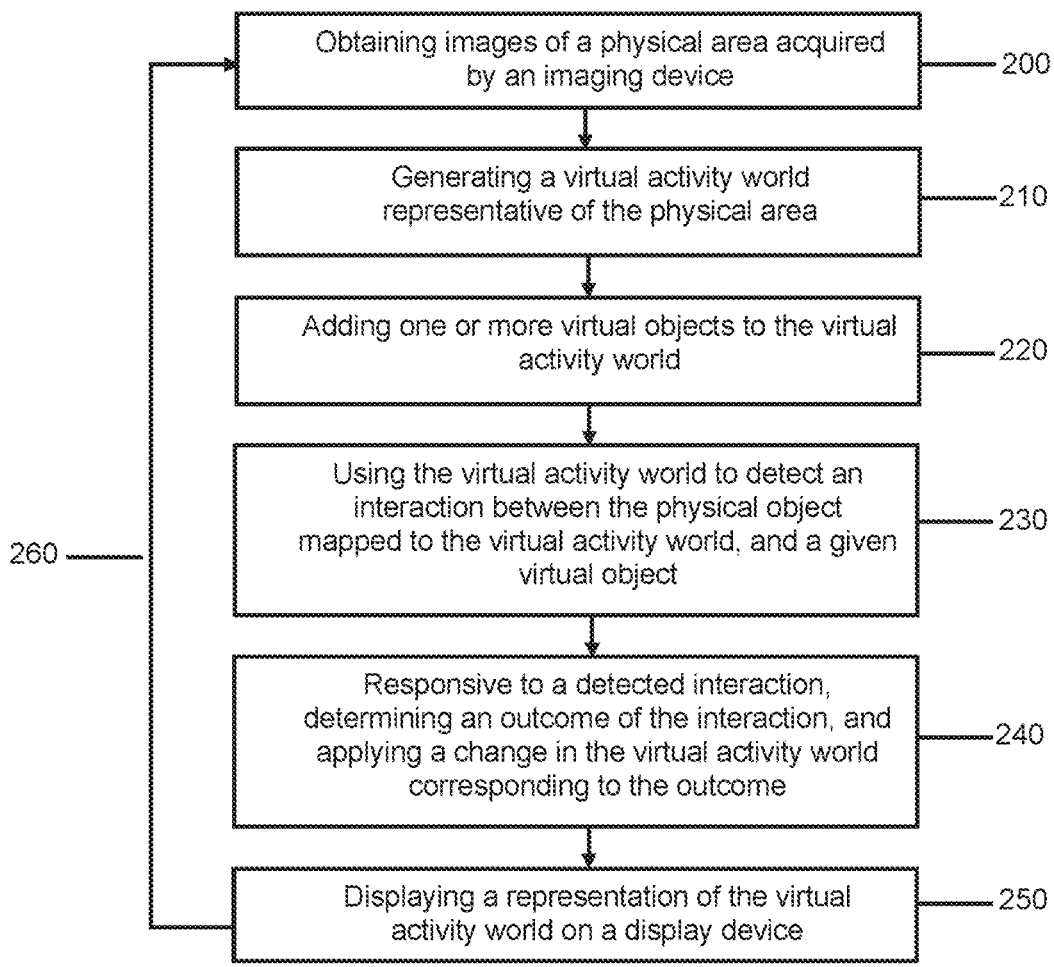
FIG. 2A illustrates a generalized flow-chart of a method of generating a virtual activity world.

Attention is now drawn to FIG. 2A, which describes a method which can be used to enable a user to perform an interactive activity (involving augmented reality) in a physical area, using e.g., the computerized device 100.

Note that the method of FIG. 2A (and the different methods described hereinafter) can be performed in real time or quasi real time, which means that for an image or frame of the physical area acquired at time T, virtual elements can be superimposed on the image (displayed at time T) to reflect interaction of the user with the physical area at this time T (or at a time $T_1$ which differs from T by a duration smaller than a threshold, if there is a small delay in the processing).

The method includes obtaining (operation 200) images of a physical area acquired by the imaging device $110_1$. As mentioned above, the physical area corresponds for example to a room in which the user is performing the required activity (e.g., a game).

The images can be continuously acquired (video feed) by the imaging device $110_1$ while the user is performing the activity in the physical area.

Note that in some embodiments, the imaging device $110_1$ or a system (e.g., a smartphone) comprising the imaging device $110_1$ is handled by the user, or worn by the user, or attached to the user, while the user is performing the activity in the physical area. The user can orient the field of view of the imaging device $110_1$ in order to cover a portion of the physical area in which the user is manipulating a physical object, such as a ball.

In other embodiments, the imaging device $110_1$ is located at a fixed position (e.g., on a support) and acquires images of the physical area. It is therefore not required from the user to handle the imaging device $110_1$.

In some embodiments, one or more imaging devices $110_1$, dynamically or statically operated, are directed towards the physical area, and continuously track the physical object(s) therein.

The physical area includes a plurality of physical elements. Examples of physical elements include e.g., walls, the ground of the physical area, a table, etc. Note that the physical elements can include inanimate elements (e.g., ball, bag, bat, etc.) and animate elements (e.g., a body part of the user, which can be moved by the user during the activity within the physical area).

According to some embodiments, the physical elements include at least one physical element movable by a user performing an activity within the physical area. This can include e.g., a physical object (e.g., ball, bag, bat, etc.) which can be moved by the user, and/or a body part of the user, which can be moved by the user during the activity.

The position of the physical element in the physical area is determined using the images acquired by the imaging device $110_1$ (examples of methods are provided hereinafter). It is therefore possible to track the position of the physical element over time (over the images), and to obtain data informative of the motion of the physical object. Note that in some embodiments, the physical element is represented by a virtual counterpart element in a virtual activity world, as further described hereinafter.

The method of FIG. 2A includes generating (operation 210) a virtual activity world representative of the physical area.

The virtual activity world is a virtual environment that corresponds to the real-world physical environment. Physical elements of the physical area are mapped to the virtual activity world. In particular, position of the physical elements in the physical area is mapped to a corresponding position in the virtual activity world. Each physical element (as visible in the 2D images) can be mapped to a corresponding list of coordinates (e.g., 3D coordinates) in the virtual activity world (which is defined with respect to a coordinate system specific to the virtual activity world). As explained hereinafter, the coordinate system of the virtual activity world can be aligned with a world coordinate system affixed to the physical area (or defined with respect to the physical area).

This mapping can also use predefined information provided to the system like e.g., a given size of the physical elements, to estimate a 3D location of the physical element from the 2D detection and pixel size estimation in the images.

Since some of the physical elements can be dynamic, these physical elements can be tracked in the sequence of images, and their motion can be mapped to a corresponding motion in the virtual activity world.

In order to map physical elements of the physical area to the virtual activity world, different methods can be used.

During creation of the virtual activity world (which represents the physical area in which the activity of the user is intended to occur), the physical area can be scanned using the imaging device 120.

In some examples, the processing circuitry 101 is configured to recognize certain features in the captured images, which are suitable as placeholders for tracing relative position of (physical) objects from one image to the next along a sequence of captured images.

Based on the known imaging device $110_1$ parameters (e.g., orientation, position, focal length, distortion, etc.), 2D and/or 3D (e.g., partial 3D) reconstruction of the scene (including for example the generating of a ground plane representing the physical ground or floor), and simultaneous localization of the computerized device 100 (which embeds the imaging device $110_1$) inside this virtual 3D reconstruction, can be performed.

According to some embodiments, the captured images are processed and used for plane tracking. Plane tracking refers to feature point tracking, where a group of feature points which are co-planar, i.e., all being located on a plane, are identified. This way, planes like e.g., the floor, a table, a wall in the physical area, can be identified.

In some cases, the imaging device $110_1$ is moved during the 3D reconstruction of the physical area to provide different viewing points.

Methods which enable the task of creating a virtual activity world representative of a physical area can include e.g., SLAM methods (Simultaneous Localization and Mapping).

This enables to define a world coordinate system with respect to the physical area, which can be used as the coordinate system of the virtual activity world. For example, the X-Z plane of the world coordinate system can correspond to the ground plane of the physical area, and the vertical Y axis is orthogonal to the X-Z plane.

Note that the mapping of the fixed physical elements of the physical area (e.g. ground, walls, etc.) can be performed during an initial stage (set-up). In some embodiments, this mapping can be updated over time (e.g. refined using the new images acquired by the imaging device $110_1$) or even completed over time (for example the user scans a fraction of the physical area with the imaging device $110_1$ during the set-up, and during the activity images of new fractions of the physical area are acquired).

Note that the position of the computerized device 100 can be determined using one or more of the sensors 110, and this position can be also mapped to the virtual activity world.

There is a transformation (provided e.g., by the SLAM method) between the frame/image acquired by the imaging device and the world coordinate system: this transformation depends on the extrinsic parameters of the imaging device (position, orientation, etc.). Note that this transformation evolve over time since the extrinsic parameters of the imaging device can change. This is equivalent to a representation of the camera matrix within the world coordinate system, which can be updated over time based on an estimation of the extrinsic parameters.

Additional methods enabling determination of the position of physical elements and their mapping to the virtual activity world will be described hereinafter.

In particular, methods are provided hereinafter to map mobile physical elements to the virtual activity world.

Various methods of implementing image analysis on captured images for the purpose of recognizing (including determining the type of physical elements, i.e., whether it is a ball, a foot, a bat, and optionally more detailed distinction, e.g., whether a recognized ball is a basketball, a soccer ball, or a tennis ball) and/or tracking relevant elements in the physical area can be used. Image analysis includes, for example, analysis of articulated objects in 2D or 3D (e.g., humans), potentially also including their articulation (e.g., human body features, parts and posture) and other objects in 2D or 3D (e.g., ball, goal, cones, rackets). Image analysis can be based on one single video frame, or on multiple video frames. In some examples, machine learning models (including deep learning models, such as Conventional Neural Network, Recurrent Neural Network, Recursive Neural Networks, Generative Adversarial Network (GAN) or otherwise) can be used for this purpose. One example of an image analysis task is detection of ball bounding boxes in the image stream, i.e., the area (sizes) and position of pixels in the image that correspond to the real-world position of the ball.

The method of FIG. 2A further includes adding (operation 220) one or more virtual objects to the virtual activity world. The virtual objects can be generated with various different shapes, colors, sizes, depending on the activity.

As explained hereinafter, this enables the user to watch, on the display device 120 (on which a representation of the virtual activity world is displayed), mixed reality images, including both the images of the physical area (acquired by the imaging device $110_1$) and a representation of the virtual objects overlaid on the images.

Figure 2B:
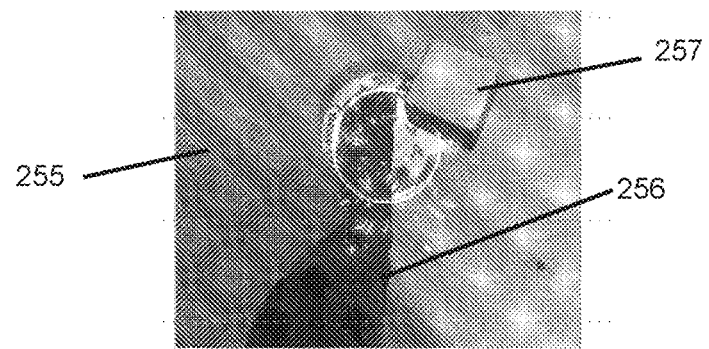
FIG. 2B illustrates a non-limitative example of a two-dimensional representation of a virtual activity world generated by the method of FIG. 2A.

A non-limitative example is provided in FIG. 2B, in which the user can watch on the display device 120, an image 255 of the physical scene including his leg 256, and a virtual object 257.

Each virtual object can have a position (e.g., 3D position) expressed in the virtual coordinate system of the virtual activity world (as mentioned above, the virtual coordinate system is generally aligned with the world coordinate system).

Each virtual object can be located and oriented in 3D space. For example, it can overlay one of the detected and tracked planes of the physical area (which have been mapped to the virtual activity world).

Each virtual object can be associated with properties informative of its geometry, its appearance (color, etc.), etc.

Each virtual object can be associated with properties determining its interaction with other virtual objects and/or with physical objects (such as ball, or a foot of a user). These properties include, by way of example: collider size, damage/credit to the player when being touched (e.g., number of health points), movement behavior, etc.

Figure 2C:
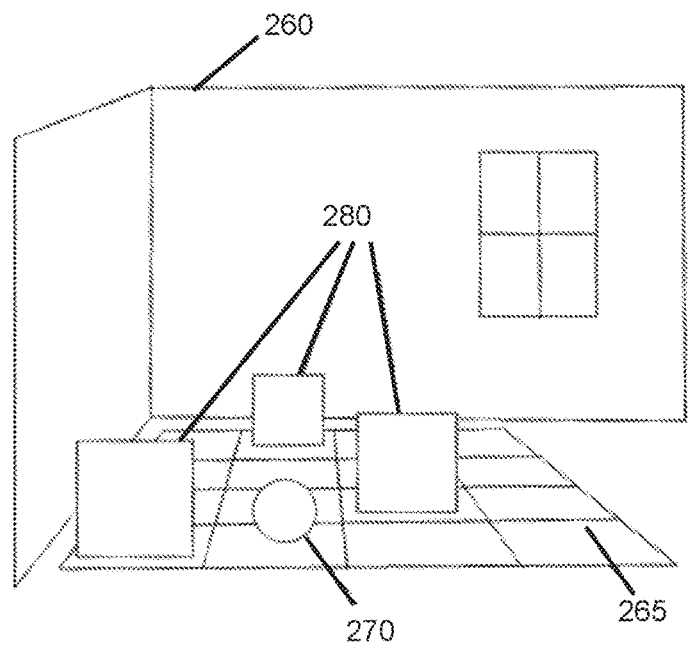
FIG. 2C illustrates a non-limitative example of a three-dimensional representation of a virtual activity world generated by the method of FIG. 2A.

FIG. 2C illustrates a non-limitative example of a three-dimensional representation of a virtual activity world (expressed in the world coordinate system affixed to the room), in which physical elements have been mapped (see wall 260, ground 265 and ball 270). The virtual activity world also includes virtual game elements 280.

The method of FIG. 2A further includes (operation 230) using the virtual activity world to detect an interaction between a physical element mapped to the virtual activity world, and a given virtual object. As mentioned above, the physical element can include an inanimate object (e.g. a ball) or an animated element (such as a part of the body of the user).

Indeed, during the activity, the user can interact with physical elements (located in the physical area) and/or with virtual objects of the virtual activity world.

For example, the user can interact with a virtual coin (generated in the virtual activity world) which is displayed on the display device as if placed on a certain location within the physical environment (e.g., a virtual coin hanging above a real-world plane of a basketball court, or virtual bricks being displayed on a physical wall).

The interaction can be in various ways, including, but not limited to, kicking or otherwise touching the virtual object, kicking a ball and hitting the virtual object with this ball, hitting the virtual object with a bat, etc. Note that the interaction can include direct contact (virtual contact between a physical object mapped to the virtual activity world and the virtual object), or a distant interaction (the physical object mapped to the virtual activity world is within a predetermined distance from the virtual object in the virtual activity world, without having direct contact).

In order to detect the interaction, the method can include comparing the position of the physical element in the virtual activity world, with the position of the given virtual object in the virtual activity world. If there is a match between the two positions (in case contact needs to be detected), or if the difference between the two positions is below a predefined threshold (in case a distant interaction needs to be detected), an interaction can be detected.

In some embodiments, the shape of the physical element (which can be determined using the images—alternatively, an estimation of the shape based on the type of the physical element which has been identified using an image recognition algorithm can be used) and/or the shape of the given virtual element, can be taken into account. When the shape of the physical element intersects the shape of the given virtual object, or when the shape of the physical element is located at a distance from the shape of the given virtual object which is below a predefined threshold, an interaction can be detected.

For example, assume that a ball has been detected in the images, and that the size of the ball is known or has been estimated from the images. A spherical collision shape (note that this shape is not limitative) corresponding to the size of the ball can be associated with the ball in the virtual activity world, which is used to detect an overlap with shapes of other virtual objects of the virtual activity world.

As explained hereinafter, in some embodiments, the physical element is represented by a virtual counterpart element in the virtual activity world and can have a shape which is different from the actual shape of the physical element. In this case, the shape of the virtual counterpart element can be used to determine whether an interaction has been performed with the shape of the given virtual object.

According to some embodiments, the virtual activity world is evaluated for the present (current) timestamp. The evaluation includes determining various parameters of physical objects such as: position, extent, velocity, weight, etc. These properties are used by the processing circuitry for determining interactions of the physical objects within the virtual activity world.

If virtual elements should simulate mass, friction, collisions (or other physical properties) in a physically accurate way, a physics solver can be used. Based on given physical properties associated with the virtual objects, a physics solver approximates their change and interactions for a given time progression (e.g. an object hits another one and thus impacts motion on the other one while being slowed down). This can typically rely on a heuristic method to solve the state of a physical system through time.

In response to detection of an interaction between a physical element and a virtual object, the method can include determining (operation 240) an outcome of the interaction and applying a change in the virtual activity world corresponding to the outcome.

In some embodiments, an outcome can be negative (e.g., damage the player's score), positive (e.g., collect coins), or neutral.

According to some embodiments, for each type of interaction, a predefined outcome is stored in a database. When a given interaction is detected, the corresponding predefined outcome is extracted from the database, and used to apply a change in the virtual activity world corresponding to the outcome.

For example, it can be stored in the database that when a physical object (mapped to the virtual activity world) hits a virtual coin, the virtual coin disappears from the virtual activity world, and a point count of the user is increased (or decreased) by an amount depending on the type of the virtual coin. This example is not limitative.

Success and failure conditions as a response to interactions of a user (either directly with a body part, or with a physical object) with an object or area (e.g., virtual object) in the virtual activity world, are part of the virtual activity world definition.

According to some embodiments, definition of the virtual activity world includes defining a level representing a certain configuration of game elements (virtual game objects) and their interactions. A game element can be any type of virtual object with attached properties defining its behavior in the virtual environment. The attached properties can include 3D extent, representation, numeric properties (such as value, health or damage, etc.) and behavioral properties such as abilities (e.g., moving in a straight line, shooting projectiles, etc.).

In some embodiments, operation 240 can include applying various metrics that measure the manner of interaction (e.g., success rate in completing a mission).

The method further includes displaying (operation 250) a representation of the virtual activity world on the display device 120.

Displaying of the virtual activity world includes displaying the images acquired the imaging device $110_1$ on the display device 120, after processing of the images. In particular, the images are processed to further include a representation of the virtual elements present in the virtual activity world. As mentioned above, each virtual element is characterized inter alia by a location and features (shape, texture, color, etc.) informative of its appearance. Based on this information, the images acquired by the imaging device $110_1$ are processed, such that the virtual elements are overlaid/superimposed on these images.

In order to display the virtual elements on the images with the correct position/orientation, the position and orientation of the imaging device $110_1$ in the referential of the physical area can be tracked and converted in the referential of the virtual activity world. This enables to understand how the imaging device $110_1$ looks at the virtual activity world, and in turn, to generate the correct 2D representation of the virtual elements on the display device 120, e.g., by projection of the 3D virtual activity world to a 2D image plane of the imaging device $110_1$. In some embodiments, this projection can be performed by assuming a pinhole camera model as explained for example in https://en.wikipedia.org/wiki/Pinhole_camera_model.

Therefore, the user who carries the computerized device 100 can monitor (by watching the video feed displayed on the display device 120), in real time, the effect of his behavior in the physical area on the virtual elements. As mentioned above, the virtual activity world can be updated continuously, each time a new image (or with a different frequency, e.g., every other frame) is acquired and received by the system.

In some examples, a system with a dynamic viewpoint (handheld AR device e.g., smartphone held by the user, AR headset, etc.) can be implemented. In this case, the user/player is required to either actively control his handheld device to capture the relevant objects (ball, physical area) in the imaging device's view throughout the physical movement required by the game or have a device that passively or naturally keeps the relevant objects in view (e.g., a headset). To receive feedback from the game, the user needs to be able to view the screen.

In some examples, where a smartphone is being used, the smartphone can be held in the user's hand during the activity. While the user is moving the smartphone and points the imaging device of the smartphone in various directions, the processing circuitry tracks the 3D position and orientation of the imaging device with respect to the physical area. At the same time, the same movement of the smartphone is applied to the virtual viewpoint within the virtual activity world. This way, the virtual elements (objects) stay in overlap with the real world, and the virtual activity world displayed on the display device, is adapted according to the viewpoint, thus providing realistic user experience.

Note that the operations described with reference to FIG. 2A can be repeated over time (see reference 260), in order to provide a continuous update of the images (which include a real-world visualisation mixed with virtual elements influenced by the behaviour of the user in the physical area) displayed on the display device 120.

The mapping of the mobile physical elements to the virtual activity world is updated over time, to reflect the motion of the physical elements. Regarding the mapping of the fixed physical element (e.g., ground, walls), this mapping can be updated and/or refined over time, when new images are acquired.

Various examples of activities will be provided hereinafter. Some introductory examples are provided below.

As explained above, a dynamic virtual activity world is generated and displayed, which is continuously adapted according to the user interactions.

The user interaction with the virtual activity world is tracked, using the images captured by imaging device $110_1$, and changes are automatically applied to the virtual activity world in response to the user interaction.

Figure 14A:
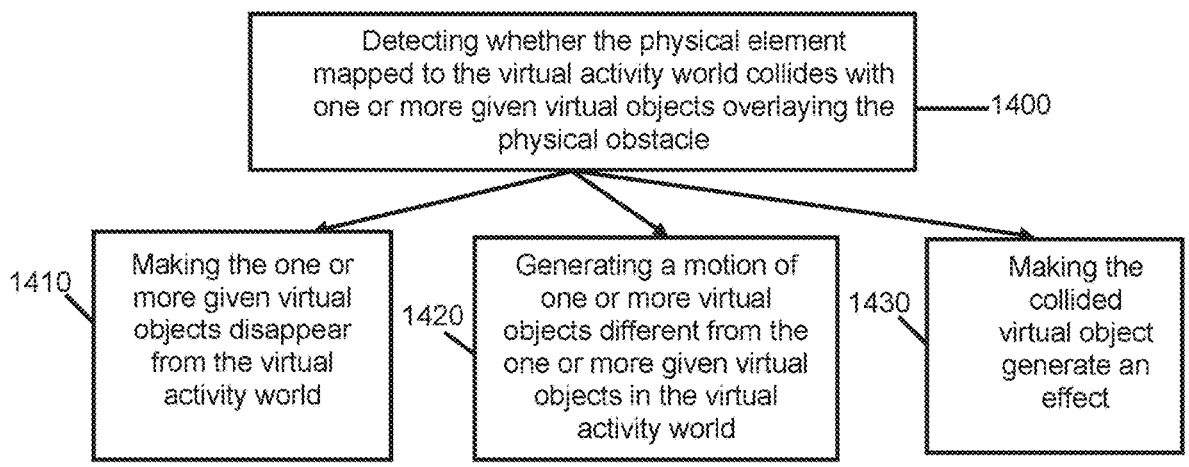
FIG. 14A illustrates a generalized flow-chart of a method of generating a change of the virtual activity world in response to a detection of an interaction between a physical element moved by the user towards a physical obstacle with one or more mobile virtual obstacles (virtually) overlaying the physical obstacle.
Figure 14B:
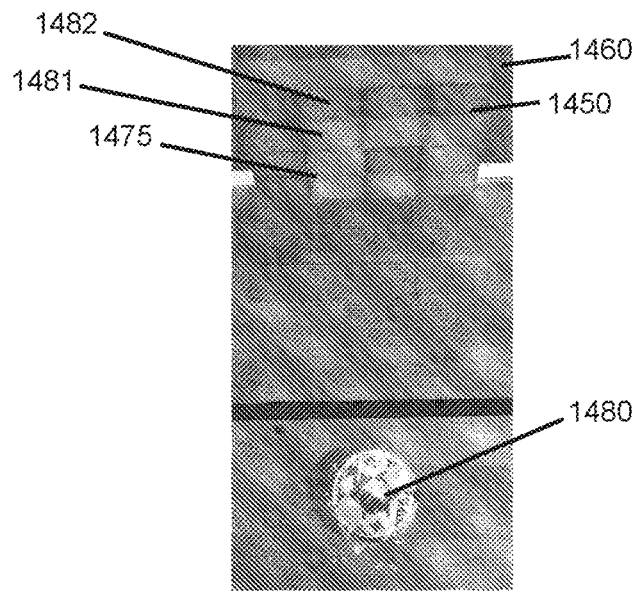
FIGS. 14B to 14D illustrate non-limitative examples of an output of the method of FIG. 14A.
Figure 14C:
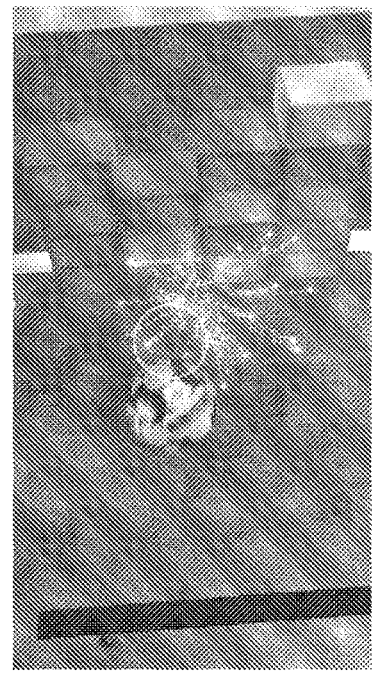

In the game described hereinafter with reference to FIGS. 14B and 14C, the user is required to hit virtual bricks which are displayed (e.g., are shown to apparently fall from above onto the floor, or onto each other) as overlaying a physical obstacle (such as a wall) displayed in the images.

In a more specific example, the user holds his smartphone in his hand during the activity, such that an imaging device of the smartphone is pointed towards the physical wall and a display device of the smartphone is facing the user. The user is required to hit the bricks by kicking a physical ball towards the wall in the direction of the bricks displayed on the screen. The user succeeds if he can hit the wall at the location where a brick is displayed on the screen. In some examples, responsive to the bricks being hit, the bricks which have been hit disappear, and new bricks are generated and displayed on the screen, e.g., by spawning or falling from the top. While the user is interacting with the virtual world (e.g., by kicking a ball on the wall with the intent to hit virtual objects overlaying the wall on the display device), the imaging device captures images of the user (e.g., the user's foot kicking the ball) and of the physical object used by the user for interacting with the virtual world (e.g., physical ball). The processing circuitry 101 processes the images and applies various measurements on user performance. Based on these measurements, the processing circuitry 101 applies changes to the displayed virtual objects in a manner that affects the user experience. In this connection, user performance includes, for example, the dynamics of the physical object used for interacting with the virtual activity world and the dynamics of the user body (e.g., foot).

For example, images of the ball while in motion after being kicked are processed by the processing circuitry 101, and the ball dynamics, such as its speed, is determined/estimated. Parameters of the virtual activity world which are displayed to the user can change in response to the detected speed.

Assume for example another wall game in which the user is kicking a physical ball onto a physical wall, and in which virtual objects (e.g., bricks or target icons) are displayed over the wall. The virtual objects can appear and/or disappear and/or reappear. The speed at which the virtual objects disappear and reappear is influenced by the speed of the physical object.

In some examples, the disappearing/reappearing speed of the virtual objects is increased if the speed of the ball movement increases. Conversely, disappearing/reappearing speed decreases if the speed of the ball movement decreases.

Alternatively, or additionally, the speed of the kicking foot can be determined from the images (using image recognition algorithms over a sequence of images, which can involve using trained machine learning algorithms to detect the kicking foot) and used in the same manner. Likewise, in case of a batting game in which the user swings a bat in attempt to hit disappearing/reappearing virtual objects (e.g., balls), the disappearing/reappearing speed can be dynamically adapted according to the speed at which the bat is swung.

According to some examples, changes to the virtual world can be applied in real time as fast as possible, where the dynamics of the physical object or of the body part of the user are processed, and parameters of the virtual objects in the virtual activity world are adapted immediately.

For example, in case a ball is being kicked towards a wall in a wall game, the speed of the ball is determined, and the virtual object displayed on the wall changes immediately before the ball hits the wall. In other words, dynamics of a user action are determined, and virtual objects are adapted according to the dynamics of the user action, before an interaction resulting from the user action occurs.

According to some embodiments, the measurements of user performance can include a level of success in completing the task (e.g., how well the user succeeds in hitting the bricks). The processing circuitry 101 applies changes to the virtual activity world according to the user performance measurements. This includes for example (but is not limited to) changing the size of virtual objects (e.g., decreasing the size of the virtual object (bricks) in case of detected user success and/or increasing their size in case of detected user failure), changing the speed in which virtual objects appear, re-appear, and/or move (e.g., increasing the speed of movement of the virtual object (bricks) in case of detected user success and decreasing their speed of movement in case of detected user failure), etc.

As mentioned above, the user receives feedback when performing an activity. The feedback includes, for example, a score given according to success in completing a task. The feedback can also include some visual or acoustic feedback, etc. According to some examples of the presently disclosed subject, the feedback is adapted according to the user performance (e.g., depending on the physical object dynamics or body dynamics). For example, the scoring is increased in accordance with the speed of the ball, where the faster the speed of the ball, the higher the scoring.

Figure 3:
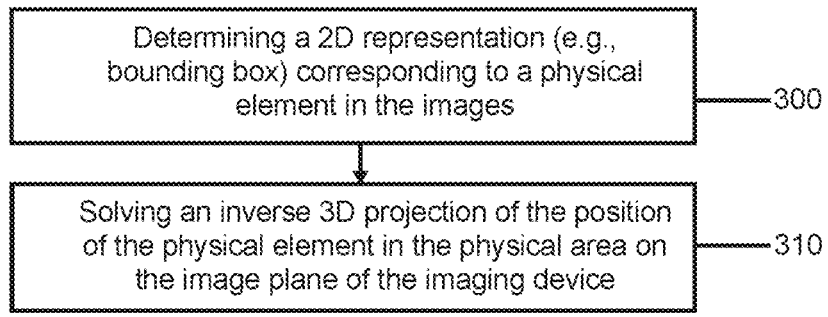
FIG. 3 illustrates a generalized flow-chart of a method of determination of the three-dimensional position of a physical element in a physical area.

Determination of the Three-Dimensional Position of a Physical Element in the World Coordinate System Attention is drawn to FIG. 3, which describes a method of determination of the three-dimensional position of a physical element in the physical area.

The method of FIG. 3 includes determining (operation 300) a two-dimensional representation (for example a bounding box) corresponding to the physical element in the images. Operation 300 can be performed using e.g., image recognition algorithms, which can involve trained machine learning models, YOLO (You Only Look Once), etc.

In some embodiments, an estimate of the dimension of the physical element can be provided as an input.

Intuitively, once the physical element has been identified in the two-dimensional images, it is possible to draw a virtual ray from the physical object to the three-dimensional position of the imaging device $110_1$ (which is known). However, the exact position of the physical element on this virtual ray has to be estimated (this corresponds to the depth information).

Therefore, the method of FIG. 3 can further include solving (operation 310) an inverse 3D projection of the position of the physical element in the physical area on the image plane of the imaging device $110_1$, using information including the dimensions of the physical element and the known parameters of the camera (e.g., camera orientation, position, focal length, distortion, etc.). This enables to estimate the 3D position of the physical element in the physical area, based on the images. As a consequence, a three-dimensional virtual element representative of the physical element can be generated in the virtual activity world.

In particular, by knowing the extrinsic parameters of the imaging device for each image acquired at a given time, it is possible to transform the position of the physical element from the referential of the image to the world coordinate system, which is aligned with the physical area. During this process, the relation of the detected object size in the image and the known size of the real object can be used in order to obtain the distance of the object from the camera. A three-dimensional position in the world coordinate system is therefore obtained, which can be recalculated for each image. Since the virtual activity world can be expressed in the world coordinate system, a mapping of the physical element to the virtual activity world can be obtained.

In some embodiments, the activity of the user corresponds to a ground game (also called floor game), and the physical object is assumed to be located on the ground of the physical area.

Assume that the position of the ground plane and the pose of the imaging device $110_1$ with respect to the ground plane have been detected (position of the ground plane can be determined using e.g. SLAM). This information can be used to estimate the position of the physical object on the virtual ray (by intersecting the virtual ray with the ground), and, therefore, to determine the three-dimensional position of the physical object in the physical area, based on the images acquired by the imaging device $110_1$.

Optionally, if the real size of the physical object is given, or can be estimated, the estimation of the location of the physical object can be further improved by shifting the ground plane upwards with the known radius of the physical object, before the intersection is calculated.

Therefore, the three-dimensional position of the physical object in the referential of the virtual activity world can be obtained.

Generation of a Virtual Counterpart Element

Figure 4A:
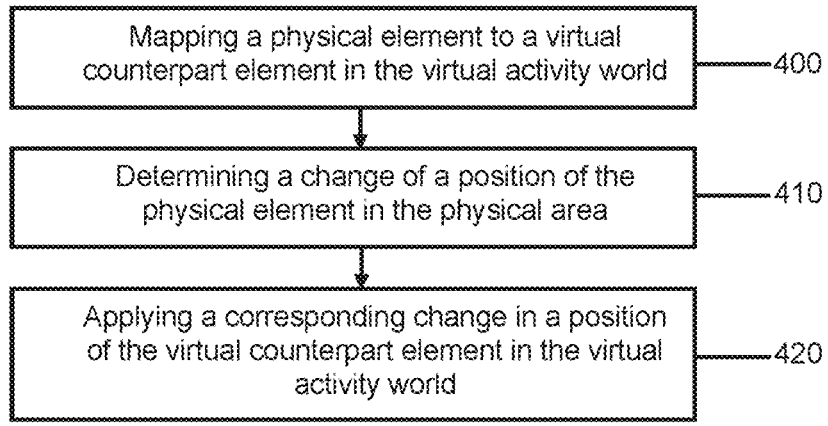
FIG. 4A illustrates a generalized flow-chart of a method of generating a virtual counterpart element corresponding to a physical element in a physical area.

Attention is now drawn to FIG. 4A.

According to some embodiments, assume that the user is manipulating (e.g., moving) a physical element in the physical area. For example, as visible in FIG. 4B (which represents an image acquired by the imaging device $110_1$ at a given instant), the user is moving a ball 450 within the physical area and/or the user is moving a body part (e.g. the user is moving his leg).

As already explained above, the physical element is mapped to the virtual activity world. In some embodiments, the physical element can be mapped to a virtual counterpart element (also called proxy element/proxy object) in the virtual activity world (operation 400).

Figure 4B:
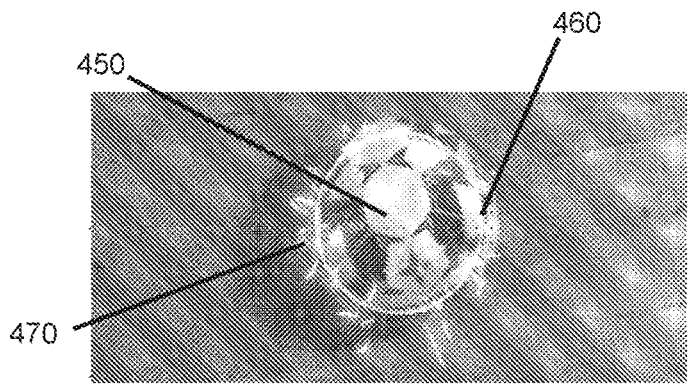
FIG. 4B illustrates a non-limitative example of an output of the method of FIG. 4A.

In the non-limitative example of FIG. 4B, the physical ball is mapped to a virtual counterpart ball 460 in the virtual activity world.

In another example, a body part of the user can be mapped to a virtual counterpart body part in the virtual activity world.

When a change in a position of the physical element in the physical area is detected (operation 410—this can be detected using the images provided by the imaging device $110_1$), the method of FIG. 4A can include applying (operation 420) a corresponding change in a position of the virtual counterpart element in the virtual activity world (using the mapping between the camera frame and the world coordinate system of the virtual activity world).

Since the location of the physical element can be continuously tracked, any change in the location parameters and/or motion parameters of the physical element can be applied to the respective virtual counterpart element that represents that element, thereby providing a continuous virtual display of a virtual counterpart element representing the location and/or motion of the physical element.

In some embodiments, the virtual counterpart element is overlaid on the physical element in the images. In the example of FIG. 4B, the user can see the physical ball 450 on which a virtual ball 460 (represented by a virtual circle) with special visual effects (e.g., a plurality of flashes of lightning 470) is overlaid.

In some embodiments, the method can include processing the images of the imaging acquisition device $110_1$ to delete the physical element from the images, and to insert, at the location of the deleted physical element, a virtual counterpart element replacing the physical element.

Figure 4C:
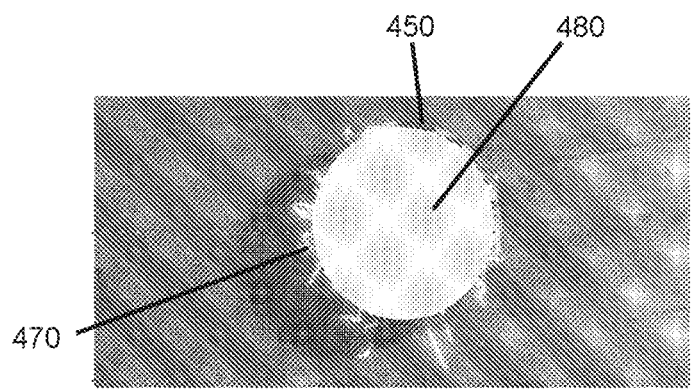
FIG. 4C illustrates another non-limitative example of an output of the method of FIG. 4A.

In some embodiments, the method can include processing the images of the imaging acquisition device $110_1$ to overlay on the physical element the virtual counterpart element, wherein the virtual counterpart element masks entirely, mostly, or at least partially, the physical element in the image. An example is shown in FIG. 4C, in which the virtual counterpart ball 480 masks most of the physical ball 450.

Generation of a Virtual Counterpart Element with Specific Features

Attention is now drawn to FIGS. 5A to 5D.

As explained above, in some embodiments, a physical element can be mapped to a virtual counterpart object in the virtual activity world (operation 500).

According to some embodiments, the physical element can be mapped to a virtual counterpart element which has different features from the physical element (operation 510).

Assume for example that the physical element has a known given size. The virtual counterpart element can be generated with a size which is smaller than the given size, or larger than the given size. Note that the size is only an example of the features of the virtual counterpart element which can differ from the actual features of the physical element.

According to some embodiments, the color and/or the shape and/or the texture, and/or the dimensions and/or the modelled physical behavior of the virtual counterpart element can differ from the corresponding features of the physical element.

When the user moves the physical element, this induces a corresponding motion of the virtual counterpart element in the virtual activity world. In some embodiments, the user is required to perform an interaction between the physical element and one or more virtual objects. Instead of detecting an interaction between the physical element (as defined by its actual features) and virtual objects, it is possible to detect an interaction between the virtual counterpart element (as defined by its features which differ from the actual features) and the virtual objects (operation 520 in FIG. 5D).

According to some embodiments, features (e.g., the size) of the virtual counterpart element are changed depending on a level of difficulty of an activity to be performed by the user with the physical element. A non-limitative example is provided with reference to FIG. 5B.

The processed image 550 displayed on the display device 120 (which reflects the virtual activity world) includes the image of the physical ball 560 manipulated by the user in the physical area, on which a virtual counterpart ball 570 of larger size is superimposed.

Figure 5A:
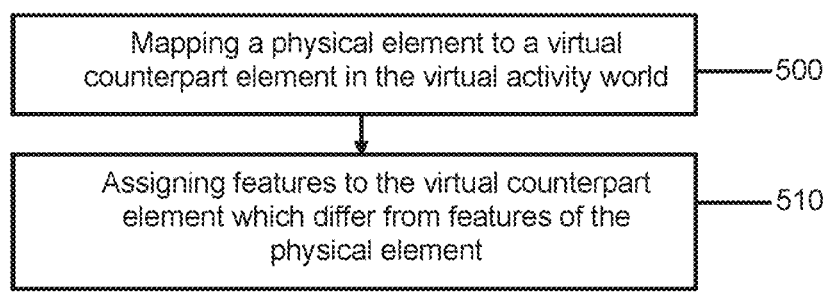
FIG. 5A illustrates a generalized flow-chart of a method of generating a virtual counterpart element corresponding to a physical element in a physical area, wherein the virtual counterpart element has one or more features which differ from actual feature(s) of the physical element.
Figure 5B:
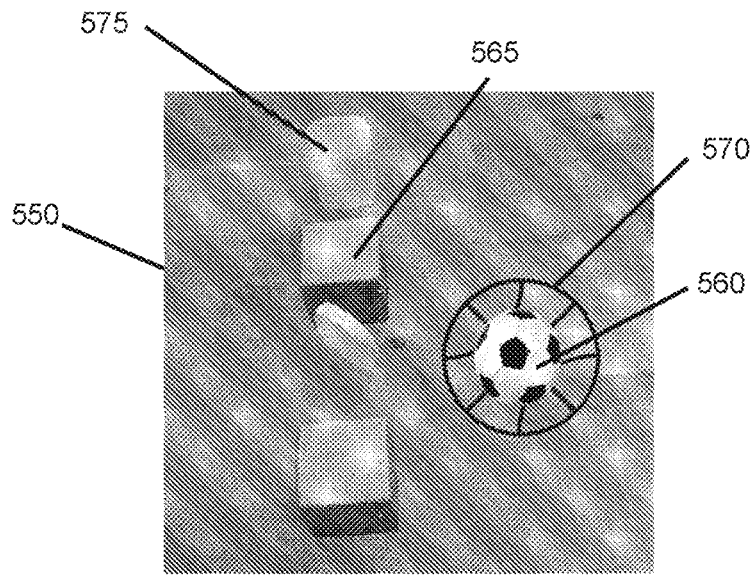
FIG. 5B illustrates a non-limitative example of an output of the method of FIG. 5A.

In the example of FIG. 5B, the activity to be performed by the user is a game in which the user is required to move a physical ball 560, while avoiding a collision between the physical ball 560 and one or more virtual obstacles 565. Note that the collision between two objects can depend in particular on the size of the two objects. The method can include detecting whether the virtual counterpart ball 570 of larger size avoids a collision with the one or more virtual obstacles 565. In other words, the level of difficulty of the game is increased, since it is more difficult to avoid a collision when using the virtual counterpart ball 570 than when using the physical ball 560.

Figure 5C:
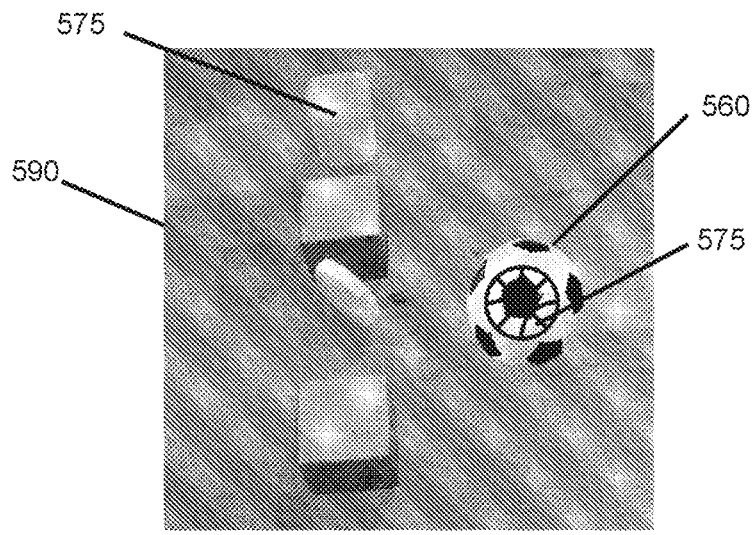
FIG. 5C illustrates another non-limitative example of an output of the method of FIG. 5A.
Figure 5D:
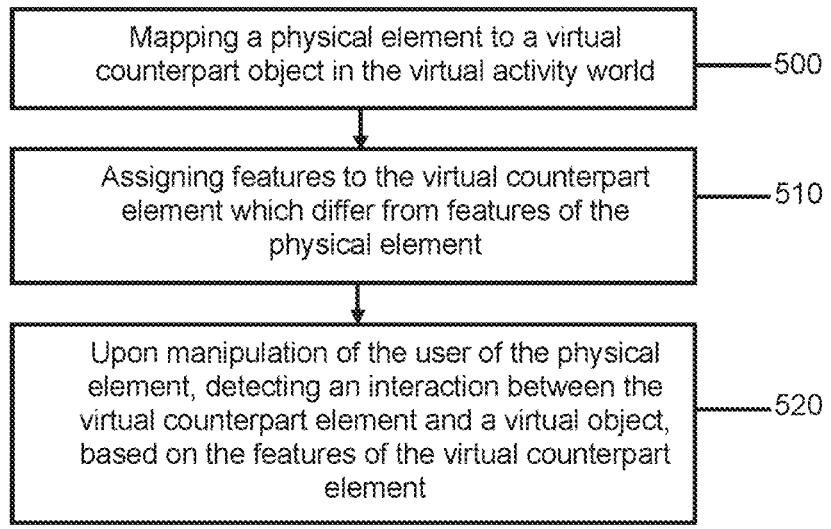
FIG. 5D illustrates a generalized flow-chart of a method of determining an interaction between a virtual counterpart element corresponding to a physical element in a physical area, with one or more virtual objects, wherein the virtual counterpart element has one or more features which differ from actual feature(s) of the physical element.

Another non-limitative example is provided with reference to FIG. 5C.

The processed image 590 displayed on the display device 120 (which reflects the virtual activity world) includes the image of the physical ball 560 manipulated by the user in the physical area, on which a virtual counterpart ball 575 of smaller size is superimposed.

The method can include detecting whether the virtual counterpart ball 575 of smaller size avoids a collision with the one or more virtual obstacles 565. In other words, the level of difficulty of the game is decreased, since it is easier to avoid a collision when using the virtual counterpart ball 570 than when using the physical ball.

In some examples, features (e.g., a size) of the virtual counterpart element are generated to differ from features of the physical element, to change a level of difficulty of an activity in which the user is required to make the virtual counterpart element collide with one or more virtual objects of the virtual activity world.

In the example of FIG. 5B, it is easier for the user to induce a collision of the virtual ball 570 with the virtual object 575, than if he had to induce a collision of the physical ball 560 with the virtual object 575. For this task, the level of difficulty of the game is therefore reduced.

In the example of FIG. 5C, it is harder for the user to induce a collision of the virtual ball 570 with the virtual object 575, than if he had to induce a collision of the physical ball 560 with the virtual object 575. For this task, the level of difficulty of the game is therefore increased.

Note that the same principles can be used for a body part of the user, which can be represented in the virtual activity world by a virtual counterpart body part (which can have different features, such as size or geometry, than the actual features of the body part). In some embodiments, interaction between the body part of the user and virtual objects can be determined using the features of the virtual counterpart body part instead of the actual features of the body part.

According to some embodiments, assume that activities are provided for different users, each interacting with a different physical element.

In some embodiments, if the interaction between the physical element and the virtual objects is detected using the actual features of the physical element, this can create inequity between the users. Assume for example that a first user manipulates a small ball in the physical area, and that a second user manipulates a large ball in the physical area. If the activity requires the user to move the physical ball to avoid collision with virtual objects, the activity is easier for the first user than for the second user. Therefore, the method can assign a virtual counterpart object which have the same features (e.g., size) for various users, irrespective of the actual features of the physical objects of the various users.

Alternatively, each user can be provided with a virtual counterpart element (e.g., a virtual ball) with a different size, e.g., for the purpose of providing a different user experience for each one of the different users (e.g., players).

The one or more features defining the virtual counterpart element can be modified dynamically, to adapt to the current task.

In particular, the size of the ball (or, more generally, features of a virtual counterpart object) can be dynamically adapted during the activity, e.g., as the users move from one task to the next. Continuously adapting the ball size, or, more generally, features of a virtual counterpart object, to the current activity, improves user experience.

In another example, for a first game (basketball game), a first type of virtual counterpart element is generated, and for a second game (football game), a second type of virtual counterpart element is generated.

In some examples, the captured images are processed in order to identify the user current location (and therefore the corresponding position in the virtual activity world). Features of the virtual counterpart element used by the user can be dynamically adapted according to the location of the user and/or to specific task(s).

According to some embodiments, features (e.g., the size) of the virtual counterpart element representing the physical element can change dynamically according to the dynamics (motion, speed, acceleration, etc.) of the physical element, and/or according to user body dynamics. For example, the size of the ball may shrink, or expand, depending on the speed at which it has been kicked by the user. Virtual effects can be generated to overlay the ball, depending on the dynamics of the ball.

In some examples, features (e.g., size) of the virtual counterpart element can be dynamically adapted to the current virtual world parameters (e.g., activity mechanics). For example, in case the virtual elements in the virtual world are fine-grained e.g., having small dimensions and closely distributed, using a large sized ball would preclude interacting with specific virtual elements, as a plurality of elements would unavoidably be touched by the ball together due to the larger surface of the ball. Thus, according to some examples, the size of the virtual counterpart ball is automatically adapted according to the granularity (or size) of the virtual elements, where in case of more fine-grained virtual elements displayed in the virtual world, the size of the ball is decreased, and vice versa.

In some embodiments, to provide compelling gameplay, certain features of the virtual counterpart element might be adapted to differ from the corresponding features of the physical element, while maintaining the same 3D position of the virtual counterpart element (or at least of the centre of the virtual counterpart element) within the virtual coordinate system.

The various embodiments (described above) can be used both for a physical object (e.g., a ball) represented by a virtual counterpart object (e.g., a virtual ball), and/or for a physical body part of the user (e.g., a leg) represented by a virtual counterpart body part (e.g., virtual leg).

Figure 6:
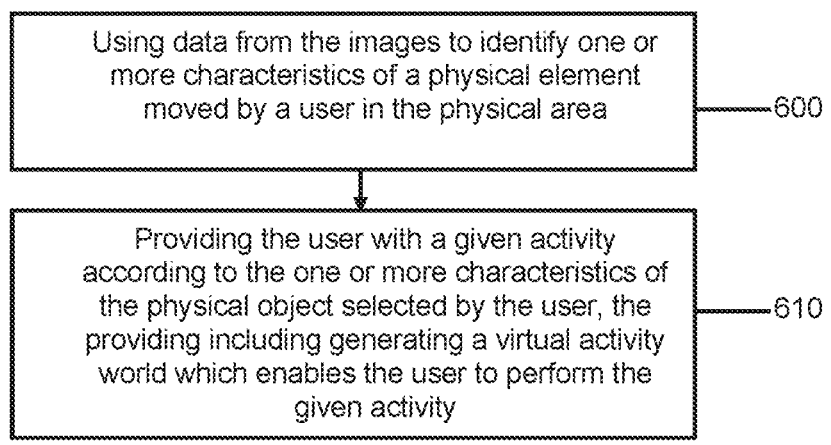
FIG. 6 illustrates a generalized flow-chart of a method of providing an activity to a user depending on characteristics of a physical element moved by the user in a physical area.

Identification of Users Based on the Physical Element, and Corresponding Generation of an Activity and/or Task Attention is drawn to FIG. 6.

The method of FIG. 6 includes (operation 600) using the sequence of images to identify one or more characteristics of a physical element moved by a user in the physical area.

The method of FIG. 6 further includes (operation 610) providing the user with a given activity according to the one or more characteristics of the physical element moved by the user. This includes generating a virtual activity world which enables the user to perform the given activity.

Various examples are provided hereinafter.

During a registration phase (for example at the beginning of the activity), different physical objects are placed in front of the imaging device $110_1$, in order to be acquired by the imaging device $110_1$.

Characteristics (e.g., physical object features such as size, color, shape etc., that would later help to identify this physical object) of the physical object are recorded and stored in a memory. These characteristics can be extracted using image recognition algorithms. The image recognition algorithms can involve e.g., use of a trained deep neural network, previously trained using supervised learning, to detect characteristics of physical objects.

In another example, during a registration phase, for example at the beginning of the activity), one or more body parts of the user are placed in front of the imaging device $110_1$, in order to be acquired by the imaging device $110_1$.

Characteristics (e.g., size, shape etc., that would later help to identify this body part) of the body part are recorded and stored in a memory (identification of the characteristics can rely for example on the algorithms mentioned above).

For each physical object (or body part), an input (provided for example by the user) to the computerized device 100 indicates the desired activity and/or the desired task and/or the desired parameters of the activity, which should be associated with the corresponding physical object. The desired parameters can include also the number of virtual objects to generate, their parameters (defining their visual appearance and/or their location), the parameters of the virtual counterpart object associated with the physical object, etc.

When a user moves a given physical element, the characteristics of the given physical element are extracted from the images acquired by the imaging device $110_1$, and the activity associated with these characteristics is identified, to generate a virtual activity world enabling the user to perform this activity.

Figure 7:
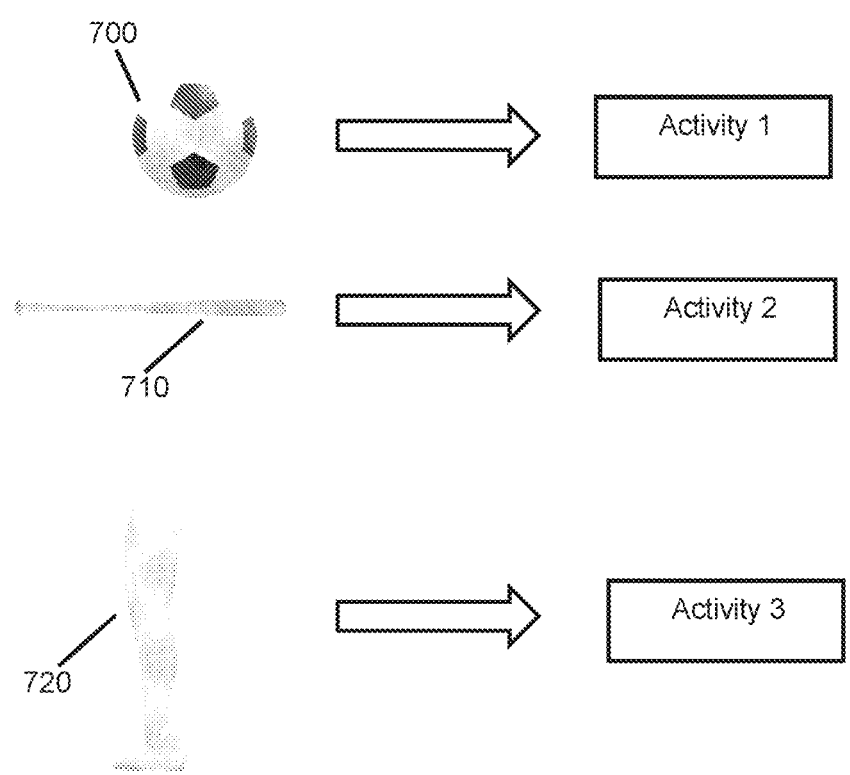
FIG. 7 illustrates a non-limitative example of an output of the method of FIG. 6.

In some embodiments, the type of physical object which is used by the user is identified, e.g., whether it is a ball or a bat (see FIG. 7). If a ball 700 is identified, an activity that is suitable for a ball is automatically provided. If a bat 710 is identified, an activity that is suitable for a bat is automatically provided.

In some embodiments, if the user shows his leg 720 to the imaging device $110_1$, an activity which involves use of a leg is automatically provided.

In some embodiments, for a given type of physical objects (e.g., a ball), a sub-category within this given type is identified. For example, it can be identified whether the ball which is being used is a basket ball or a soccer ball. A different activity is associated with each sub-category. For example, when a basket ball is identified, an activity enabling a basketball game is provided and when a soccer ball is identified, an activity enabling a soccer game is provided.

In some embodiments, during the registration phase, each physical element is associated with data informative of the identity of the user. For example, a first user is associated with a red ball of given dimensions, and a second user is associated with a blue ball of given dimensions. In addition, an input can be provided indicating, for each user, the type of activity which is desired, the level of difficulty, or other parameters of the activity. When a given physical element is identified, the identity of the user can be identified, and, therefore, the activity (parameters of the activity) corresponding to this user can be provided.

In another example, assume that at least a first user and a second user are each performing an activity (e.g., playing a game), and it is desired to provide each user with a distinctive user experience, specifically tailored for that user.

For example, the first user is manipulating a first physical object (e.g., a ball), and the second user is manipulating a second physical object (e.g., a bat, or a ball with different characteristics).

By identifying each physical object, it is possible to generate a virtual activity world which is adapted to the physical object used by each user.

Characteristics of the body parts of the users can be also used to identify the users and to provide a virtual activity world which is adapted to each user.

Figure 8:
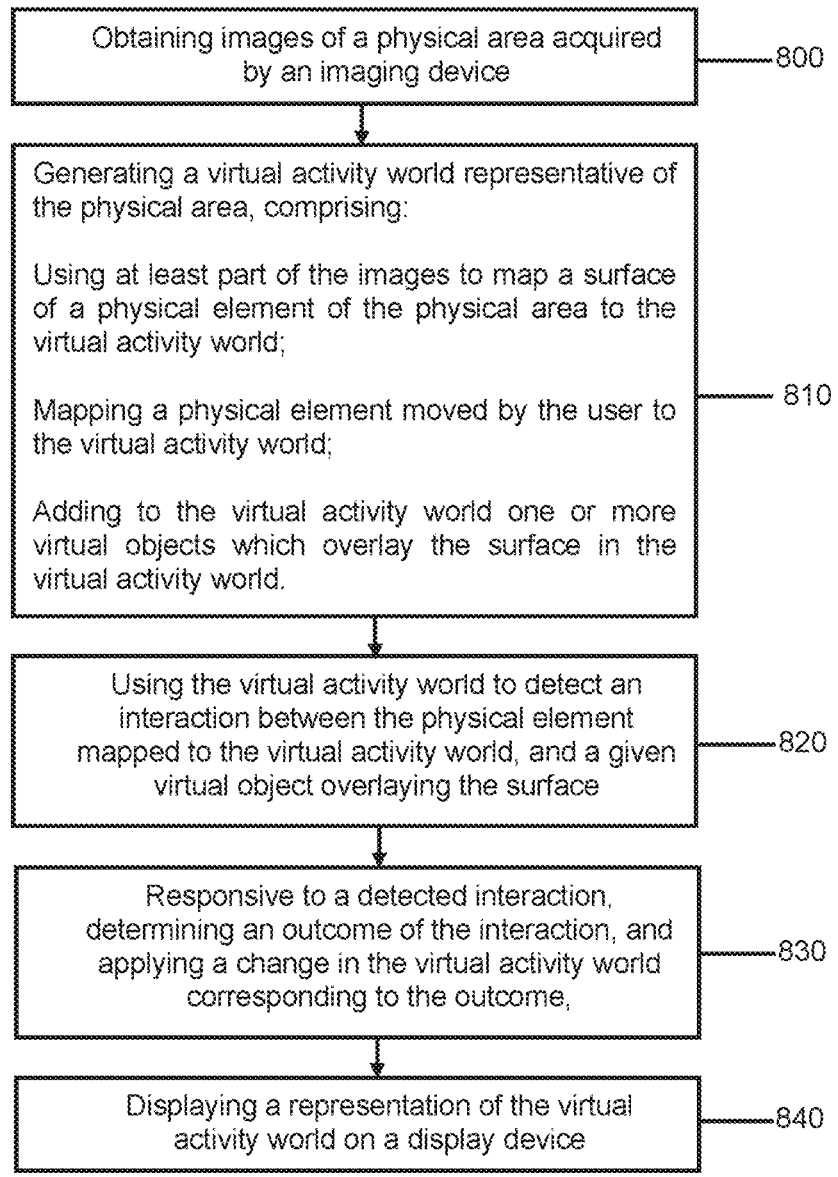
FIG. 8 illustrates a generalized flow-chart of a method of generating a virtual activity world in which a surface of a physical obstacle (e.g., surface of the ground and/or of a wall) is mapped to the virtual activity world, thereby enabling various activities in which an interaction is performed with the surface.

Description of Various Activities Involving a Surface (e.g. a Plane) of the Physical Area Attention is now drawn to FIG. 8.

The method of FIG. 8 includes (operation 800) obtaining images of a physical area acquired by the imaging device $110_1$, wherein the physical area enables a user to perform an activity involving moving at least one physical element. Operation 800 is similar to operation 200 and is not described again.

The method of FIG. 8 further includes (operation 810) generating a virtual activity world representative of the physical area. This includes using at least part of the sequence of images to map a surface of a physical element of the physical area to the virtual activity world. The surface is for example a plane (planar surface), such as the surface of a physical obstacle (e.g. wall) of the physical area, the surface of the ground of the physical area, etc. The surface can be e.g. horizontal or vertical. The surface is typically a flat (or substantially flat) surface.

Operation 810 also includes mapping the physical element moved by the user to the virtual activity world, using the images acquired by the imaging device $110_1$. Various embodiments have been described above to map a physical object and/or a body part of the user to the virtual activity world and can be used herein.

Some examples of activities disclosed herein include floor and/or wall games/exercises.

This can include wall games/exercises, which include the tracking of user interaction (e.g., using some physical object, e.g., a ball, or a body part of the user) with a physical vertical surface of a physical obstacle, such as the vertical surface of a wall (or other physical obstacles which have a vertical surface, such as a door, etc.).

These activities can require a physical flat surface and can include tracking user interaction with virtual objects overlaying such a flat surface. The user interaction can be tracked and can include usage of a physical object such as ball (this can also include tracking an interaction performed by the user using a body part).

As mentioned above, mapping of a surface to a virtual activity world can include using for example SLAM methods (Simultaneous Localization and Mapping).

In various activities, it is desired to display virtual elements which overlay a surface of the physical area. The virtual elements should therefore have a location in the virtual activity world in which they overlay the surface of the physical area as mapped to the virtual activity world. As a consequence, when displaying the virtual activity world on the display device, these virtual elements appear as overlaying the surface of the physical area in the images.

According to some examples, a virtual wall can be displayed as coinciding with a real wall. According to some examples, one or more virtual objects can be displayed as appearing in contact with a wall, or as being in close proximity to the wall. According to some examples, one or more virtual objects can be displayed as appearing as lying on the ground of the physical area.

Therefore, the method of FIG. 8 can include adding (operation 830) to the virtual activity world one or more virtual objects which overlay the surface (mapped to the virtual activity world). This includes the fact that the virtual objects appear (when displayed on the images) as being in contact with the real surface, or as being in close proximity with the real surface (to provide a user experience where there is a direct link between the virtual objects and the corresponding real surface).

The method of FIG. 8 further includes using the virtual activity world to detect (operation 820—similar to operation 230) an interaction between the physical element mapped to the virtual activity world (note that the physical element is moved by the user in the physical area) and a given virtual object overlaying the surface mapped to the virtual activity world.

The method of FIG. 8 further includes, responsive to a detected interaction, determining (operation 830—similar to operation 240) an outcome of the interaction, and applying a change in the virtual activity world corresponding to the outcome, and displaying (operation 840—similar to operation 250) a representation of the virtual activity world on a display device.

Various activities which can rely for example on the method of FIG. 8 are described hereinafter.

Figure 9A:
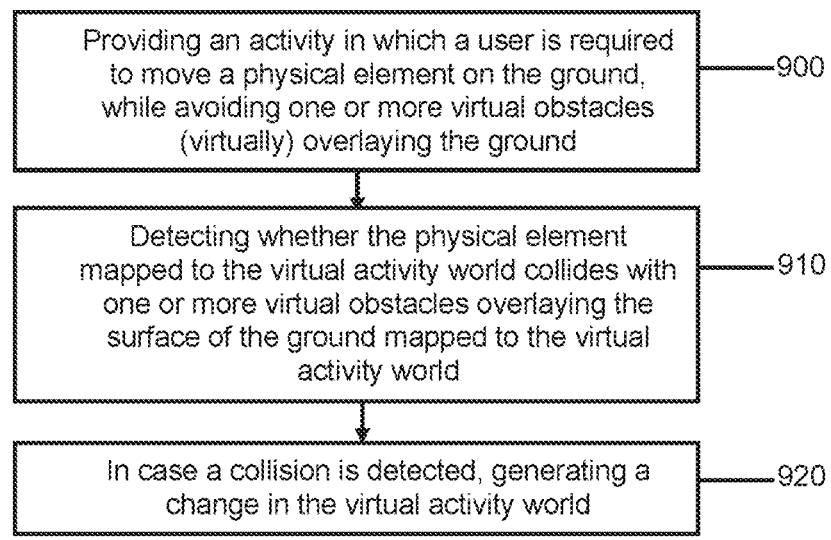
FIG. 9A illustrates a generalized flow-chart of a method of providing an activity to a user in which he is required to move a physical element on a ground, while avoiding a collision with one or more virtual obstacles (virtually) overlaying the ground.
Figure 9B:
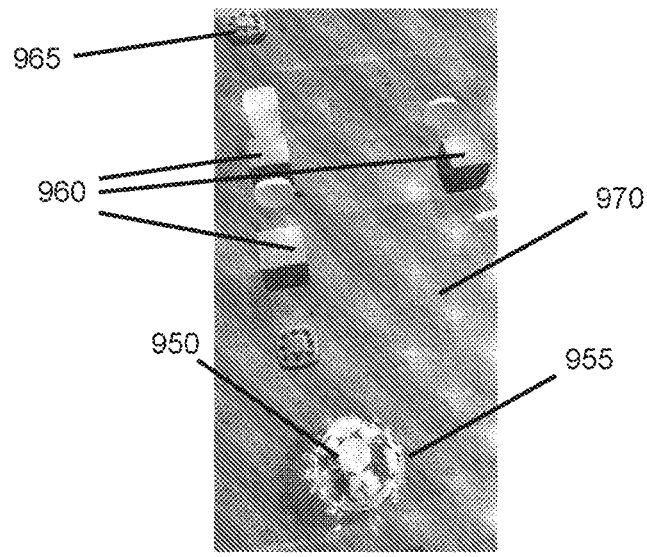
FIG. 9B illustrates a non-limitative example of an output of the method of FIG. 9A.

Attention is now drawn to FIGS. 9A and 9B, which describe activities involving virtual object(s) overlaying the surface of the ground of the physical area.

Assume that the surface of the ground of the physical area has been mapped to the virtual activity world, and that one or more virtual objects overlay the ground in the virtual activity world.

The method of FIG. 9A provides an activity in which the user is required to move (operation 900) a physical element (e.g., a ball—note that the method can be used also for a body part of the user) on the ground (which is mapped to the virtual activity world, as explained above) while avoiding a collision of the physical element with one or more virtual objects displayed as overlaying the surface of the ground. The user can be required to move the physical element from a given starting point to a given end point.

The method of FIG. 9A includes detecting (operation 910) whether the physical element (as moved by the user) mapped to the virtual activity world collides with one or more virtual obstacles overlaying the surface of the ground mapped to the virtual activity world.

If a collision is detected, a corresponding change can be generated in the virtual activity world. For example, a point count of the user can be decreased (the point count can be displayed on the display device 120, and can be part of the virtual activity world), a virtual effect can be applied on the virtual obstacle, etc. If no collision is detected, no change needs to be performed.

A non-limitative example of the method of FIG. 9A is provided in FIG. 9B, which depicts an image of the virtual activity world, as displayed on the display device 120.

As visible in FIG. 9B, the user has to move the ball 950 from a starting point 955 to an end point 965, while avoiding virtual obstacles 960 virtually located on the ground 970 of the physical area.

Figure 9C:
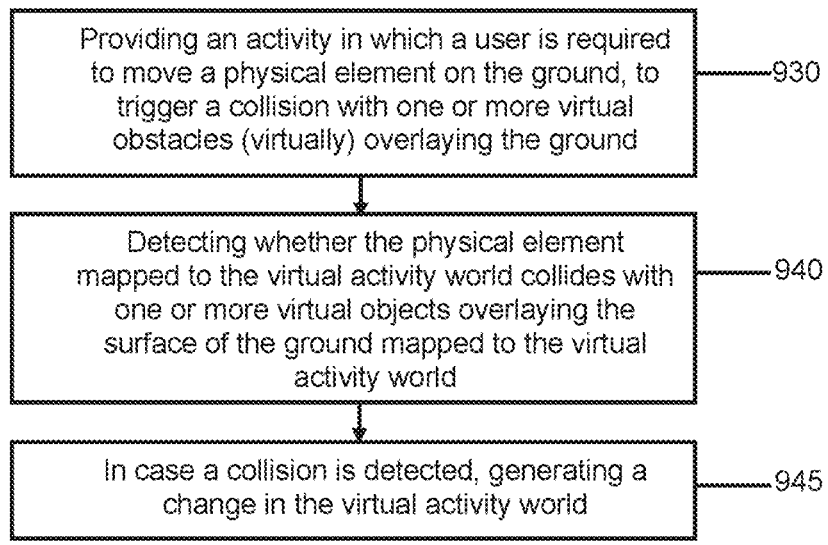
FIG. 9C illustrates a generalized flow-chart of a method of providing an activity to a user in which he is required to move a physical element on a ground, in order to trigger a collision with one or more virtual obstacles (virtually) overlaying the ground.
Figure 9D:
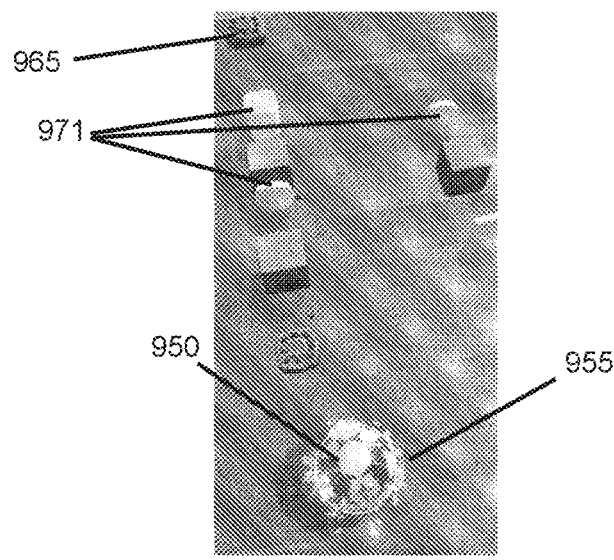
FIG. 9D illustrates a non-limitative example of an output of the method of FIG. 9C.

Attention is now drawn to FIGS. 9C and 9D, which describe additional activities involving virtual object(s) overlaying the surface of the ground of the physical area.

Assume that the surface of the ground of the physical area has been mapped to the virtual activity world, and that one or more virtual objects overlay the ground in the virtual activity world.

The method of FIG. 9C provides an activity in which the user is required to move (operation 930) a physical element (e.g., a ball) on the ground (which is mapped to the virtual activity world, as explained above) to trigger a collision of the physical element with one or more virtual objects located on the surface of the ground mapped to the virtual activity world. The user can be required to move the physical element from a given starting point to a given end point.

The method of FIG. 9C includes detecting (operation 940) whether the physical element (as moved by the user), mapped to the virtual activity world, collides with one or more virtual obstacles displayed as overlaying the surface of the ground.

If a collision is detected, a corresponding change can be generated (operation 945) in the virtual activity world. For example, a point count of the user can be increased (the point count can be displayed on the display device 120, and can be part of the virtual activity world), a virtual effect can be applied on the virtual object, etc. If no collision is detected, no change needs to be performed.

A non-limitative example is provided in FIG. 9D, which depicts an image of the virtual activity world, as displayed on the display device 120.

As visible in FIG. 9D, the user has to move the ball 950 from a starting point 955 to an end point 965 and is required to trigger a collision between the ball 950 and virtual objects 971 virtually located on the ground 970 of the physical area.

Note that the methods of FIGS. 9A and 9C can be combined. In this case, the user is required to move the physical element to achieve two goals: avoiding a collision of the physical element with one or more virtual obstacles displayed as being located on the surface of the ground and triggering a collision of the physical element with one or more virtual objects displayed as being located on the surface of the ground. Depending on the interaction (authorized interaction/forbidden interaction) which is detected, a corresponding change is applied to the virtual activity world, as explained above.

Figure 10A:
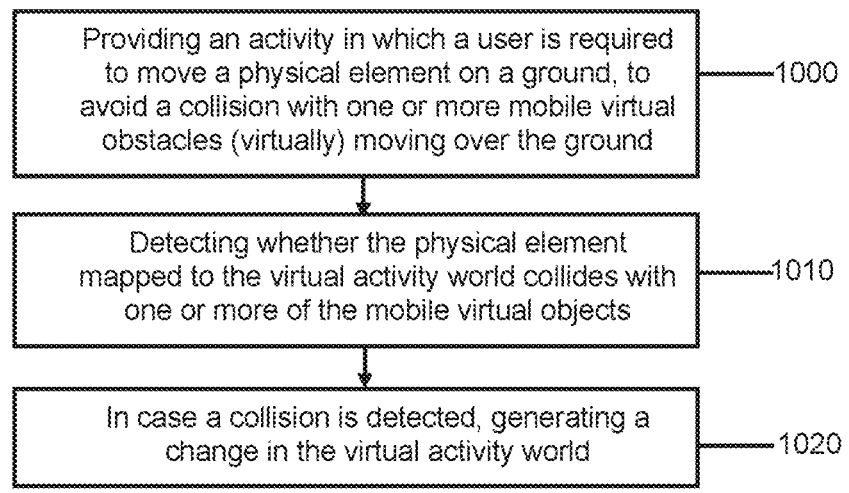
FIG. 10A illustrates a generalized flow-chart of a method of providing an activity to a user in which he is required to move a physical element on a ground, while avoiding one or more mobile virtual obstacles (virtually) moving over the ground.
Figure 10B:
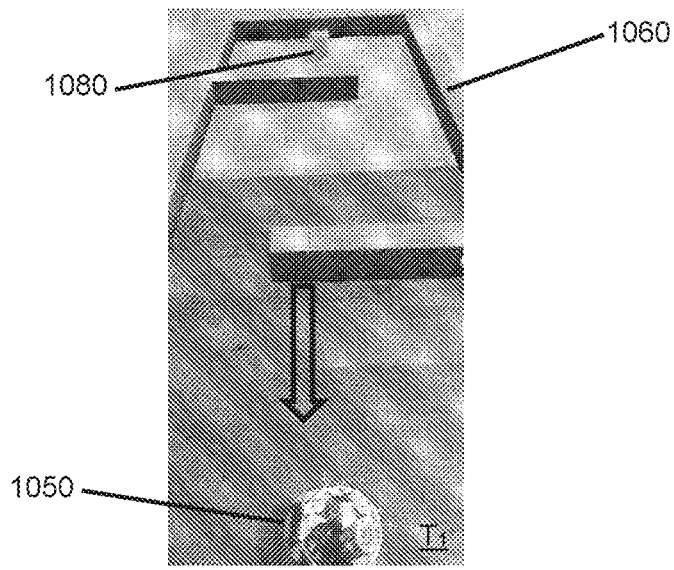
FIG. 10B illustrates a non-limitative example of an output of the method of FIG. 10A.
Figure 10C:
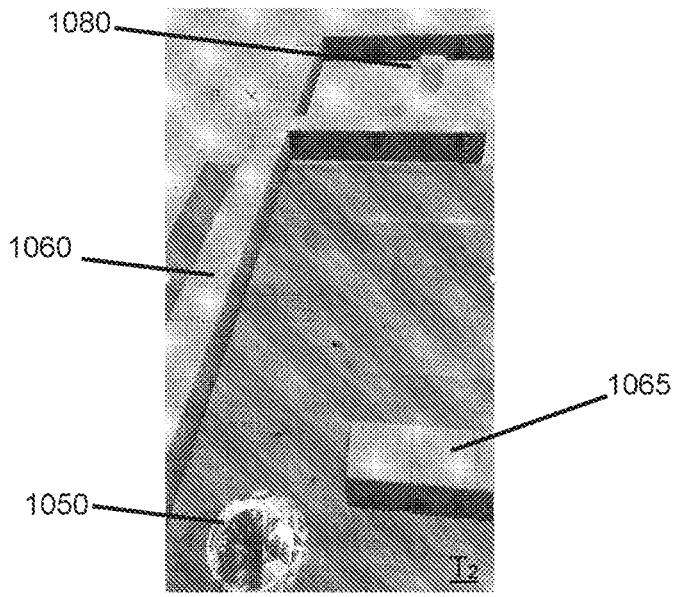
FIG. 10C illustrates another non-limitative example of an output of the method of FIG. 10A.

Attention is now drawn to FIGS. 10A to 10C, which describe other activities involving virtual object(s) overlaying the surface of the ground of the physical area.

Assume that the surface of the ground of the physical area has been mapped to the virtual activity world, and that one or more virtual objects overlay the ground in the virtual activity world.

The method of FIG. 10A provides an activity in which the user is required to move (operation 1000) a physical element (e.g., a ball or a body part) on the ground (which is mapped to the virtual activity world, as explained above) while avoiding a collision of the physical element with one or more mobile virtual obstacles displayed as moving over the surface of the ground in the images. For example, the motion can include a translation in which the virtual obstacles appear to slide on the ground. This is not limitative.

According to some embodiments, the one or more virtual obstacles move over the surface towards the position of the imaging device $110_1$ (the position of the imaging device $110_1$ in the physical area is known, using one or more of the sensors 110, and is mapped to the virtual activity world). In other words, the user has the feeling that the virtual obstacles get closer to him over time.

The user can be required to move the physical ball along a direction substantially orthogonal (e.g., to the left or the right) to the direction of translation of the moving virtual objects.

One or more methods enabling generation of mobile virtual objects will be described hereinafter.

The method of FIG. 10A includes detecting (operation 1010) whether the physical element (as moved by the user) mapped to the virtual activity world collides with one or more of the mobile virtual obstacles.

If a collision is detected, a corresponding change (operation 1020) can be generated in the virtual activity world. For example, a point count of the user can be decreased (the point count can be displayed on the display device 120, and can be part of the virtual activity world), a virtual effect can be applied on the virtual obstacle, etc. If no collision is detected, then the virtual obstacles can pursue their motion and disappear from the display device 120 (as if they pass behind the user handling the imaging device $110_1$).

A non-limitative example of the method of FIG. 10A is provided in FIGS. 10B and 10C, which depict images of the virtual activity world, as displayed on the display device 120.

As visible in FIG. 10B (corresponding to the representation of the virtual activity world at time $T_1$), the user has to move the ball 1050 on the ground, to avoid a collision with the virtual obstacles 1060 moving towards his position in the physical area. The virtual obstacles 1060 appear as sliding on the ground. Note that new virtual obstacles can be generated over time, to maintain a continuous experience that virtual objects move towards the user (indeed, as mentioned above, once the virtual objects pass behind the position of the user, they disappear from the images).

In FIG. 10C (corresponding to the representation of the virtual activity world at time $T_2$ posterior to $T_1$), the user moved the ball 1050 on the ground to the left direction, thereby avoiding a collision with the row 1065 of virtual obstacles 1060.

Although the method of FIGS. 10B and 10C has been described in the context of virtual obstacles, it can be used similarly in an activity in which the user is required to move a physical element (e.g. a ball or a body part) on the ground (which is mapped to the virtual activity world, as explained above) to trigger a collision of the physical element with one or more mobile virtual objects displayed as moving over the surface of the ground in the images. The virtual object can be displayed as moving towards the position of the imaging device $110_1$ or of the user. If a collision is detected, a corresponding change can be generated in the virtual activity world. For example, a point count of the user can be increased.

This is illustrated in FIG. 10C, in which the user is required to trigger a collision between the physical ball 1050 and the virtual object 1080 which moves towards the position of the user in the images.

Note that the method of FIG. 10A can be combined with the method of FIGS. 9A and 9C. In particular, static virtual objects can be overlaid on the ground of the physical area, and the user can be required to move the physical element to either avoid the static virtual objects and/or to trigger a collision with the static virtual objects.

Figure 11A:
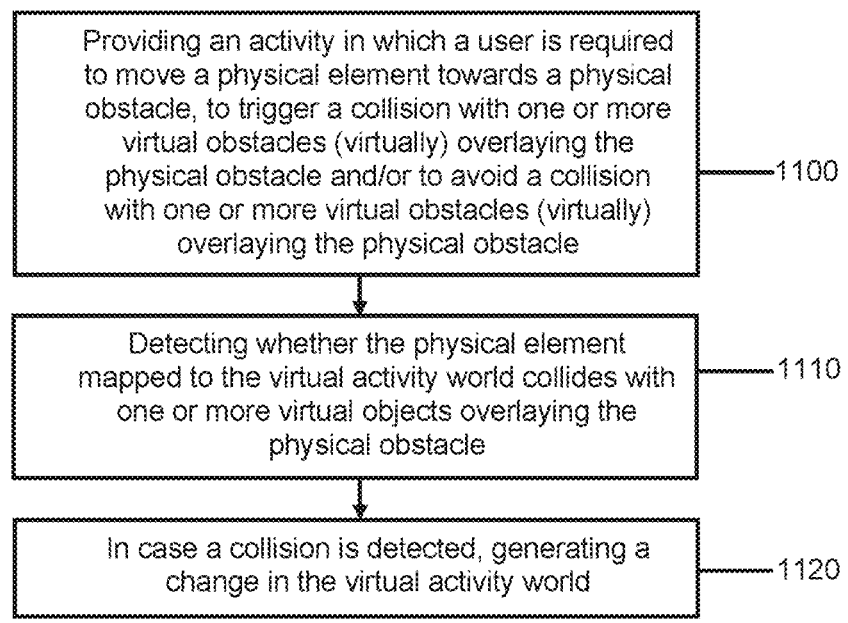
FIG. 11A illustrates a generalized flow-chart of a method of providing an activity to a user in which he is required to move a physical element towards a physical obstacle, to avoid a collision with one or more mobile virtual obstacles (virtually) overlaying the physical obstacle, and/or to trigger a collision with one or more mobile virtual obstacles (virtually) overlaying the wall.
Figure 11B:
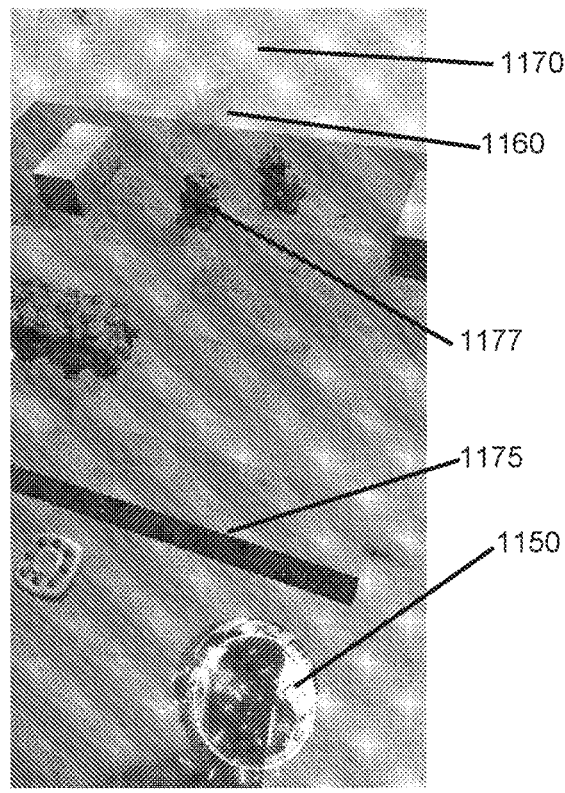
FIG. 11B illustrates a non-limitative example of an output of the method of FIG. 11A.

Attention is now drawn to FIGS. 11A and 11B, which describe activities involving virtual objects overlaying the surface of a physical obstacle (e.g., wall) of the physical area.

Assume that the surface of a physical obstacle (e.g., wall) of the physical area has been mapped to the virtual activity world, and that one or more virtual objects overlay the wall in the virtual activity world. As explained above, the virtual objects can be displayed as being in contact with the wall on the images, or as being in close proximity with the wall on the images.

An activity can be provided in which the user is required (operation 1100) to move the physical element (e.g., to hit a ball, or to move a body part) towards the physical obstacle (e.g., wall). In particular, the user can be required to move the physical element to trigger a collision between the physical element (as mapped in the virtual activity world) and a virtual object overlaying the physical obstacle, and/or to avoid a collision between the physical element (as mapped in the virtual activity world) and a virtual object overlaying the physical obstacle.

Note that this method can be combined with the various methods described above, meaning that the user can be required to trigger a collision with static and/or virtual objects located at various positions in the activity world (e.g., on the ground), and/or to avoid a collision with static and/or virtual objects located at various positions in the activity world (e.g., on the ground).

For example, the user is required to kick the ball to hit certain virtual game elements (e.g., coins, keys, power-ups, finish targets), but at the same time avoid hitting other virtual game elements (e.g., negative coins, damaging objects, blocking objects). Based on the interactions performed by the user, game elements can change their state (they can either be static, move, disappear, re-appear, etc.).

The method of FIG. 11A includes detecting (operation 1110) whether the physical element (as moved by the user) mapped to the virtual activity world collides with one or more virtual obstacles overlaying the physical obstacle (e.g., wall) in the images.

If a collision is detected, a corresponding change can be generated (operation 1120) in the virtual activity world.

In some examples, the corresponding change can include e.g., making the collided virtual objects disappear from the virtual activity world. In some examples, the corresponding change can include e.g., adding to the virtual activity world one or more new virtual objects overlaying the surface of the wall mapped to the virtual activity world.

If the rules of the activity require the user to trigger a collision with this virtual object, a point count of the user can be increased (the point count can be displayed on the display device 120, and can be part of the virtual activity world), and/or a virtual effect can be applied on the virtual obstacle, etc.

If the rules of the activity require the user to avoid a collision with this virtual object (virtual obstacle), a point count of the user can be decreased, and/or a virtual effect can be applied on the virtual obstacle, etc.

A non-limitative example is provided in FIG. 11B, which depicts an image of the virtual activity world, as displayed on the display device 120.

As visible in FIG. 11B, the user has to hit the ball 1150 from an authorized area, towards the wall 1170. The user is required to trigger a collision between the ball 1150 and the virtual object 1160 overlaying the wall 1170. The user is required to avoid a collision between the ball 1150 and one or more virtual obstacles 1177 located on the ground. Note that the virtual obstacles can include static and/or movable virtual obstacles.

In an activity which involves interaction with virtual obstacles overlaying a physical obstacle (e.g., wall), it can be required to detect whether the user moves the physical element from an initial position located within an authorized area. Indeed, if the user is located too close to the physical wall, it is easier to meet the objectives of the activity, thereby corrupting the results of the user in this activity.

Figure 12:
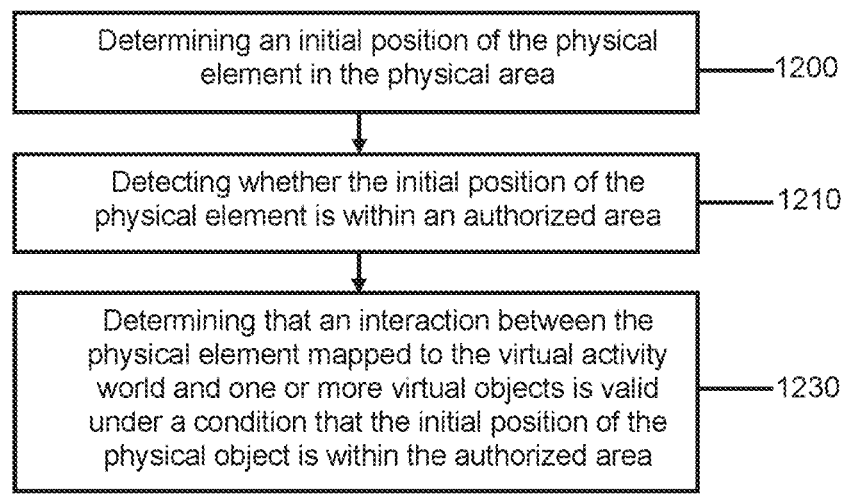
FIG. 12 illustrates a generalized flow-chart of a method of determining that a user moves a physical element from an initial position located within an authorized area.

FIG. 12 depicts a method enabling complying with the above-mentioned problem. The method includes determining (operation 1200) an initial position of the physical element in the physical area. Methods of identifying the physical element in the images, and of computing the three-dimensional position of the physical element, have been described above.

The method further includes detecting (operation 1210) whether an initial position of the physical element in the physical area is located within an authorized area. The authorized area can be e.g., defined as an area located behind a line having a distance to the wall above a threshold. In the example of FIG. 11B, a line 1175 defines the authorized area. Note that the line 1175 can include a physical line located on the ground of the physical area and/or a virtual line superimposed on the image.

In some embodiments, instead of detecting an initial position of a physical object, the method can include detecting whether an initial position of the user in the physical area is located within an authorized area. Position of the user can be detected by detecting e.g., position of the imaging device $110_1$ (in case the user is handling the imaging device $110_1$ during the activity), and/or detecting part of the body (e.g., the legs) of the user in the images (using image recognition algorithms).

According to some embodiments, the method of FIG. 12 can include determining (operation 1230) that an interaction between the physical element mapped to the virtual activity world and one or more virtual objects, is valid under a condition that the initial position of the physical element is within the authorized area. If this condition is not met, the interaction can be considered as invalid/non-existent, and can be ignored by the system.

For example, assume that the user has thrown the ball towards a virtual object overlaying the wall, and has managed to trigger a collision with the virtual object. According to the rules of the activity, the user should be rewarded (e.g., by getting an increase in his point count), and, in some embodiments, a change be applied to the display of the virtual object. However, if it is detected that the initial position of the physical object was not in the authorized area, this interaction can be considered as invalid. Therefore, the user does not get an increase in his point count, and the display of the virtual object is not necessarily modified.

In some embodiments, an alert can be raised indicated to the user that the initial position of the physical element is invalid and should be corrected.

Alternatively, the method of FIG. 12 can include determining that an interaction between the physical element mapped to the virtual activity world and one or more virtual objects is valid under a condition that the initial position of the user and/or of the imaging device $110_1$ and/or of the computerized device 100 is within the authorized area. Position of the computerized device 100 can be measured using sensors 110. Position of the user can be detected using image recognition algorithms or using the position of the computerized device 100. Position of the imaging device 1001 can be detected using the position of the computerized device 100.

According to some embodiments, during the setup of the activity, the user can be forced to place the physical object (e.g., the ball) in front of a physical obstacle from which the ball would bounce back after a shot (e.g., a wall).

This can be done either by reconstructing the 3D physical area and/or or by detecting a border of the scanned ground (which generally corresponds to a wall) and generating an indication to the user to perform the activity in an area facing the wall (or similar physical element).

More generally, it is possible to force or to focus the user to play the activity/task in a prescribed way. The interaction with the virtual objects is considered as valid only if the user performs the activity in the prescribed way.

Figure 13:
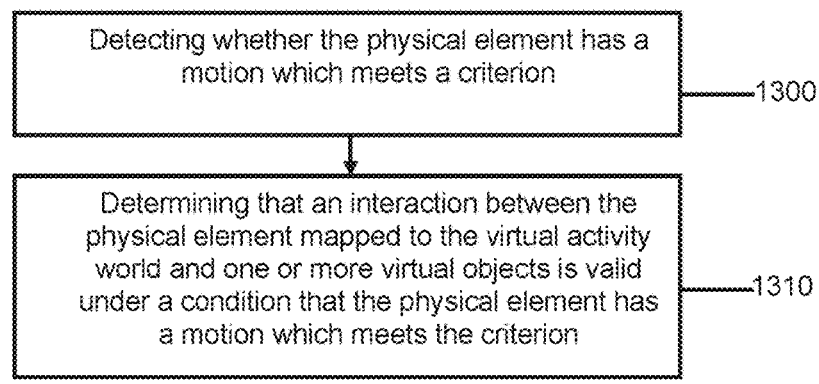
FIG. 13 illustrates a generalized flow-chart of a method of determining that a user moves a physical element along an authorized direction.

According to some embodiments (see FIG. 13), it can be detected (operation 1300) whether the physical element has a motion which meets a criterion. For example, it can be detected whether the physical element has a direction which moves away from the imaging device $110_1$ in the physical area (in other words, this indicates that the user throws the physical object away from the user's position), whether the physical element has a prescribed speed, direction of motion, etc. Since the position of the physical element can be detected using the images (and the position of the imaging device $110_1$ is known), it can be detected whether the physical element has a motion which meets the criterion.

The method can include determining (operation 1310) that an interaction between the physical element mapped to the virtual activity world, and one or more virtual objects, is valid under a condition that the physical element has a motion which meets the criterion. If this condition is not met, the interaction can be considered as invalid/non-existent.

For example, if the ball moves away from the imaging device in the physical area, the interaction is considered as valid (note that a plurality of conditions can be imposed to consider an interaction as valid).

According to some embodiments, it can be detected whether the physical element has a speed which meets a threshold. The interaction of the physical element with virtual objects is considered as valid only if the physical element meets the speed threshold. For example, only certain ball speeds might be accepted to consider that an interaction of this physical element with virtual objects is valid. It this condition is not met, the interaction can be considered as invalid/non-existent, and can be ignored by the system.

As mentioned in FIG. 11A, responsive to detection of a collision between the physical element mapped to the virtual activity world and one or more given virtual objects overlaying the surface of the wall mapped to the virtual activity world, a corresponding change can be applied to the virtual activity world.

According to some embodiments, the corresponding change can include (see operations 1400 and 1410 in FIG. 14A) making the one or more given virtual objects disappear from the virtual activity world (and therefore from the displayed images). A non-limitative example is provided with reference to FIGS. 14B and 14C.

In this example, a plurality of virtual objects (virtual bricks 1450 constituting a virtual wall) overlay the surface of a physical wall 1460.

The user hits the physical ball 1480 in order to trigger a collision with the virtual bricks 1450. The activity can require the user to generate a destruction of the virtual bricks, or to at least break/remove bricks to avoid them stacking up higher than a maximal height. Note that in some embodiments, the activity (or other activities described above or below) can be performed with a body part of the user.

When a collision is detected between the physical ball 1480 and a given virtual brick, the method can include making the virtual brick disappear from the virtual activity world (and therefore from the image). This is visible in FIGS. 14B and 14C, in which, after collision of the ball with the virtual bricks 1475, the virtual bricks 1475 have disappeared from the image displayed in FIG. 14C (which represents an instant of time posterior to FIG. 14B).

Figure 14D:
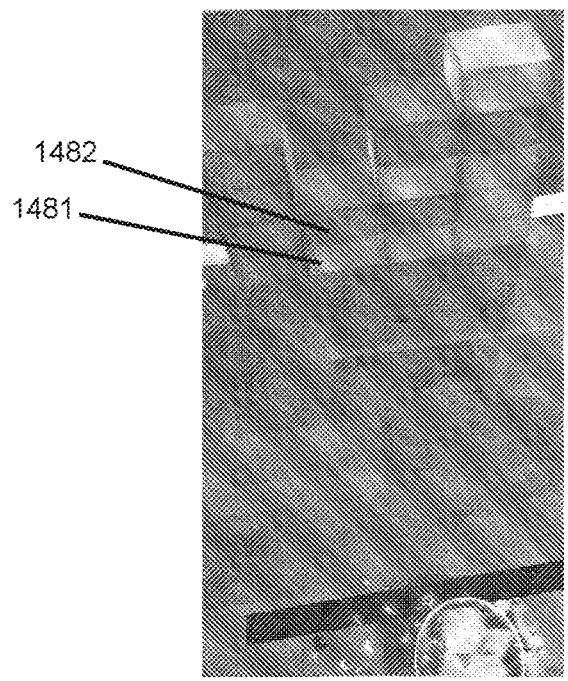

According to some embodiments, the corresponding change can include (see operations 1420 in FIG. 14A) generating a motion of one or more virtual objects different from the one or more given virtual objects (collided virtual objects) in the virtual activity world. A non-limitative example is provided with reference to FIG. 14D.

Since the user has managed to trigger hit the virtual bricks 1475, they have disappeared from the displayed images.

Since the virtual bricks simulate a virtual construction, due to gravity, the virtual bricks 1481, 1482 previously located above the virtual brick 1475, should fall. This is visible in FIG. 14D, in which the virtual bricks 1481, 1482 are moved downwards, such that virtual brick 1481 overlays the ground, and the virtual brick 1482 is located above the virtual brick 1481.

According to some embodiments, the corresponding change can include (see operations 1430 in FIG. 14A) generating an effect by the virtual objects which has been collided. In some embodiments, this effect can have an influence on other virtual objects. For example, the collided virtual object generates an effect in the virtual activity world which can cause damage/destroy other virtual objects in the virtual activity world.

According to some embodiments, the activity can provide virtual elements which constitute certain power-ups, boosters, or special bricks.

According to some embodiments, the activity can provide an interaction depending on the colour of the virtual objects. For example, bricks of the same colour are broken altogether if the user hits one brick of a cluster of bricks.

According to some embodiments, a balance between skilled and less skilled users can be obtained for the activity, by dynamically adapting the activity.

For example, the delay of new virtual bricks appearing from the top can be adjusted dynamically, based on how many virtual bricks are currently present. Virtual bricks can spawn faster if less bricks are present or stacked only at a low height. This is not limitative.

Figure 15A:
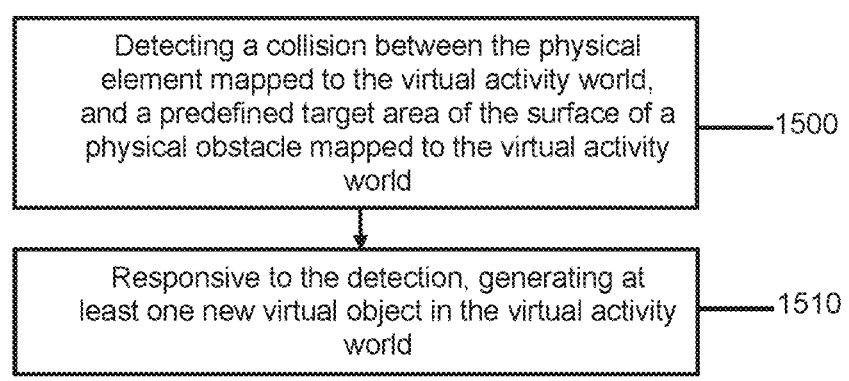
FIG. 15A illustrates a generalized flow-chart of a method of determining an interaction between a physical element and a virtual target overlaying the physical obstacle.

Attention is now drawn to FIG. 15A, which describes another embodiment of an activity involving the surface of a physical obstacle.

Figure 15B:
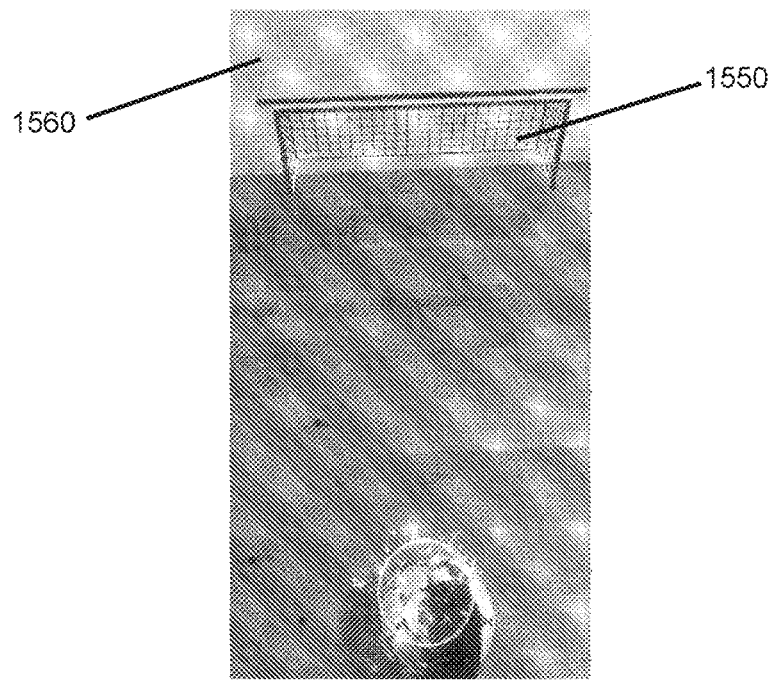
FIG. 15B illustrates a non-limitative example of an output of the method of FIG. 15A.

The method includes detecting (operation 1500) a collision between the physical element mapped to the virtual activity world, and a predefined target area of the surface of the physical obstacle mapped to the virtual activity world. In the example of FIG. 15B, the predefined target area can correspond e.g., to a virtual goal 1550, which is overlaid on the wall 1560.

Responsive to the detected collision, the method further includes generating (operation 1510) at least one new virtual object in the virtual activity world. If the physical element hits the physical obstacle out of the predefined target area, the new virtual object is not generated.

Figure 15C:
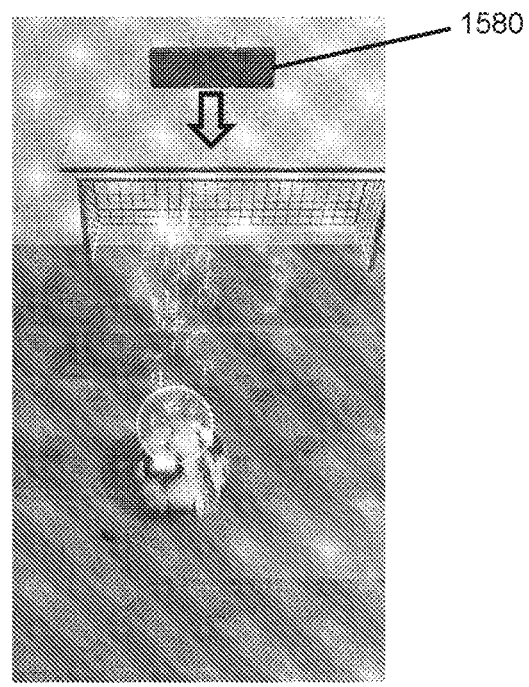
FIG. 15C illustrates another non-limitative example of an output of the method of FIG. 15A.

This enables displaying of the new virtual object in the processed images displayed to the user. In the example of FIGS. 15B and 15C, new virtual bricks 1580 appear to fall from the top. In some embodiments, the area at which the physical object has hit the wall is detected, and the new virtual object appears at a location in the images which depends on this area. For example, if the ball hits the center of the virtual goal, the virtual brick falls from the top above the center of the virtual goal. This is not limitative.

According to some embodiments, a balance between skilled and less skilled users can be obtained for the activity, by dynamically adapting the activity.

For example, the delay of new virtual bricks appearing from the top can be adjusted dynamically, based on how many virtual bricks are currently present. Virtual bricks can spawn faster if less bricks are present or stacked only at a low height. This is not limitative.

As a consequence, skilled users can get through the level very fast, while the standard delay of bricks spawning can be such that less skilled users can still enjoy the game.

Figure 16A:
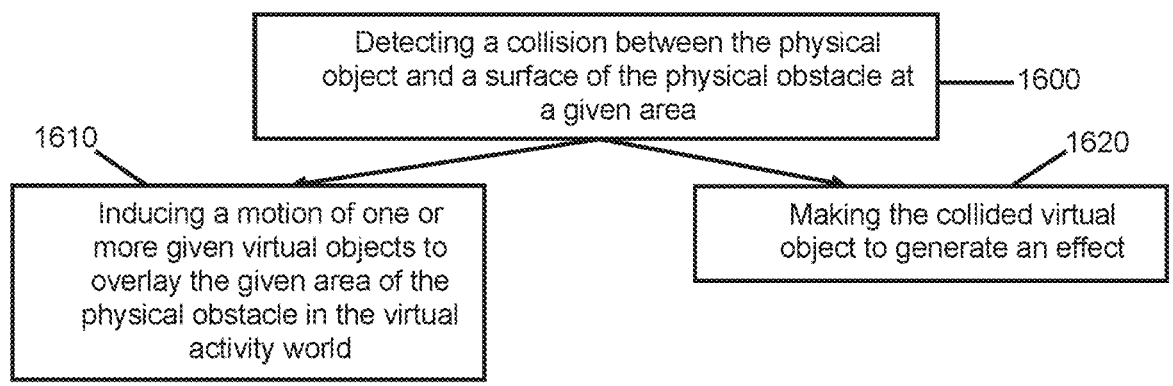
FIG. 16A illustrates a generalized flow-chart of a method of determining an interaction between a physical element and a given area of a physical obstacle, and a generation of a change in the activity world.

Attention is now drawn to FIG. 16A, which describes another embodiment of an activity involving the surface of a physical obstacle.

Figure 16B:
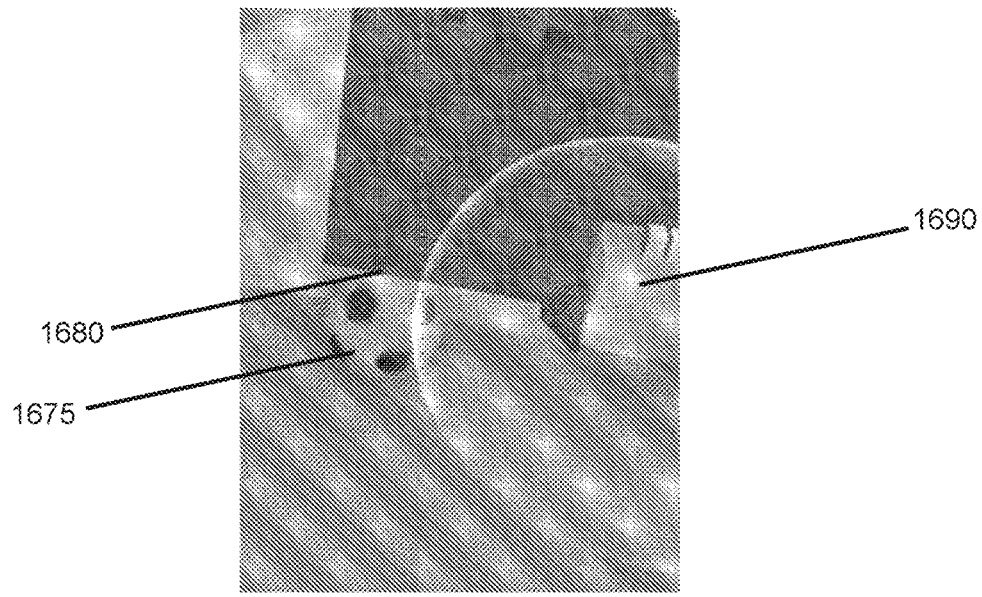
FIG. 16B illustrates a non-limitative example of an output of the method of FIG. 16A.
Figure 16C:
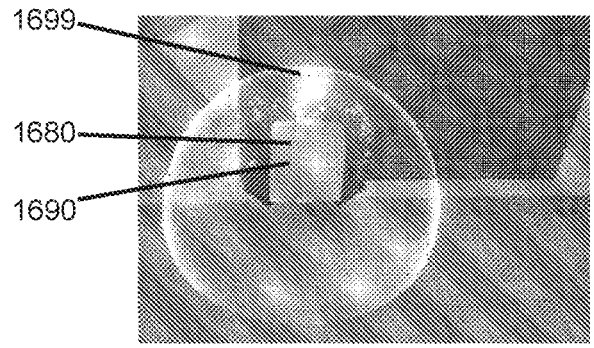
FIG. 16C illustrates another non-limitative example of an output of the method of FIG. 16A.

The method includes detecting (operation 1600) a collision between the physical element and a surface of the physical obstacle at a given area. In the example of FIG. 16B, the ball 1675 hits the wall at the given area 1680 of the wall.

Responsive to the detected collision, the method further includes inducing (operation 1610) a motion of one or more given virtual objects to the given area in the virtual activity world.

In the example of FIG. 16B, the virtual object 1690 is moved so as to overlay the given area 1680 of the wall.

According to some embodiments, the corresponding change can include (see operations 1620 in FIG. 16A) generating an effect by the virtual objects which has been collided. In some embodiments, this effect can have an influence on other virtual objects. For example, the collided virtual object 1690 generates a laser 1699 in the virtual activity world which can cause damage/destroy other virtual objects (e.g., virtual space invaders) in the virtual activity world.

As can be understood from the various embodiments above, various interactive augmented reality activities (such as games) using an imaging device (such as a smartphone) acquiring images of a user moving a physical element can be provided. The physical area is mapped to the virtual activity world, and performance of the user can be measured, to provide real-time feedback about the skills and performance of a user in that area to move the physical element as prescribed.

Dynamic Modification of the Virtual Activity World/Motion of the Virtual Activity World As mentioned above, in some embodiments, at least some of the virtual objects can be mobile. This can be used in various applications. In some embodiments, this helps to enrich the user's experience, since this enables interaction with mobile virtual elements. In some embodiments, this can help to reduce physical restrictions which are linked to the physical area. For example, in case of a ball game performed in a restricted area, e.g., which focuses on dribbling and moving the ball in certain ways, motion and other elements can be added to the virtual activity world in order to overcome restrictions on the available physical space (e.g., room size). Examples are provided hereinafter.

Figure 17A:
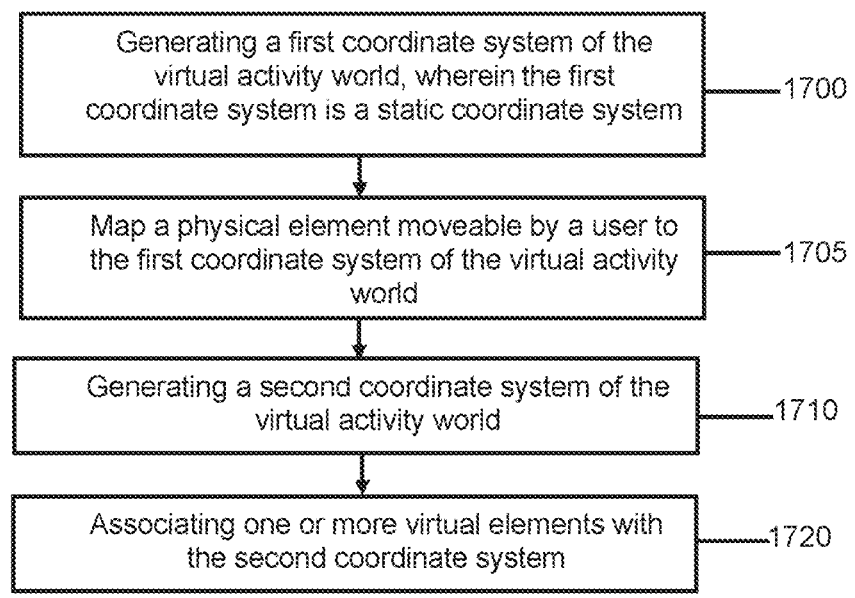
FIG. 17A illustrates a generalized flow-chart of a method of generating a motion in the virtual activity world.
Figure 17B:
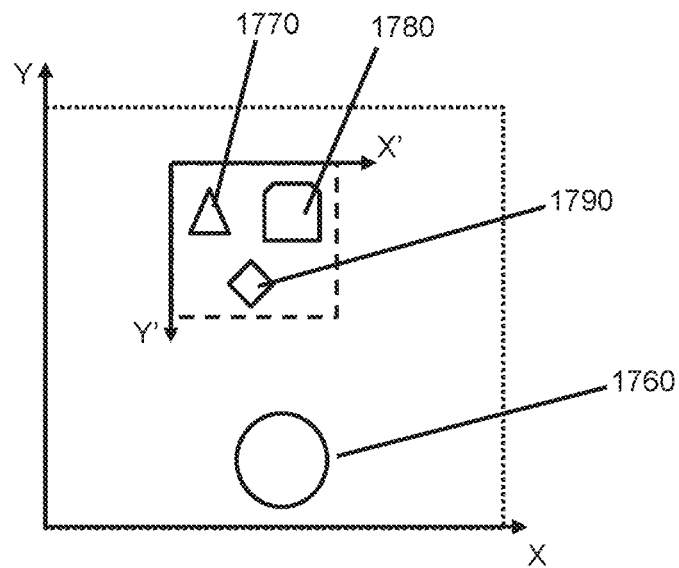
FIGS. 17B and 17C illustrate examples of the output of the method of FIG. 17A.
Figure 17C:
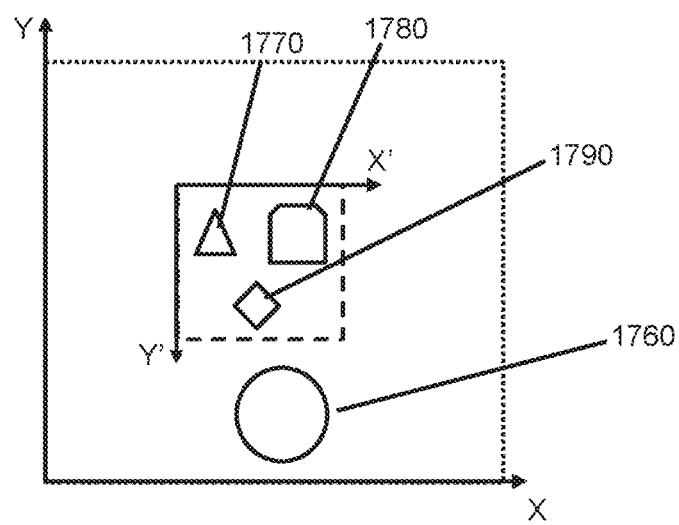

Attention is drawn to FIGS. 17A to 17C.

Once a virtual activity world has been generated (as explained e.g., with reference to FIGS. 2A and 8), the method can include generating (operation 1700) a first coordinate system of the virtual activity world. A non-limitative example is illustrated in FIG. 17B, which illustrates the first coordinate system X, Y (note that for simplification, only axes X and Y are illustrated, but, in practice, the first coordinate system can include a third axis Z). In some embodiments, the first coordinate system can be a static coordinate system (this is not mandatory as explained hereinafter).

Note that the mapping of the physical elements of the physical area to the virtual activity world generally includes mapping the physical elements to the first coordinate system. In other words, the first coordinate system is substantially static with respect to the world coordinate system associated with the physical area. The first coordinate system can be aligned with the world coordinate system.

In some embodiments, an active area is defined, which corresponds to the part (fraction) of the physical area in which the activity is to be performed. The dimensions of the active area may not be larger than the dimensions of the physical area available in the real-world environment.

In some examples, the active area can be defined using an input of the user. For example, the user marks the area on an image of the physical area using a touch screen of the computerized device 100.

In some embodiments, the active area is defined automatically, e.g., based on information extracted during reconstruction of the physical area (using e.g., SLAM). In some examples, this can include selecting the plane reconstructed from the scene which has the largest dimensions, as an approximation of the largest dimensions of the active area. Indeed, the largest reconstructed plane generally corresponds to the ground of the physical area. The first coordinate system can therefore be static relative to the active area.

A physical element (see ball 1760 in FIG. 17B) movable by the user in the physical area may be mapped (using the sequence of images) to the first coordinate system of the virtual activity world (operation 1705). When the user moves the physical element, this will induce a motion of the mapped physical element in the first coordinate system.

Note that one or more additional virtual objects can be associated with the first coordinate system.

The method further includes generating (operation 1710) a second coordinate system of the virtual activity world. A non-limitative example is illustrated in FIG. 17B, which illustrates the second coordinate system X', Y' (note that for simplification, only axes X' and Y' are illustrated, but in practice the second coordinate system can include a third axis Z'). The second coordinate system is a dynamic coordinate system (that is to say that it is a mobile coordinate system, which moves relative to the first coordinate system).

The method further includes associating (operation 1720) one or more virtual elements with the second coordinate system.

Since these virtual elements are associated with a mobile coordinate system, these virtual elements can be moved relative to the virtual activity world (that is to say relative to the virtual objects/physical objects associated with the first coordinate system of the virtual activity world).

In the example of FIG. 17B, virtual objects 1770, 1780 and 1790 are associated with the second coordinate system.

The method further includes moving (operation 1740) the at least one second coordinate system relative to the first coordinate system. As a consequence, all virtual objects associated with the second coordinate system are also moved with respect to the first coordinate system. Alternatively, it is possible to move the first coordinate system with respect to the second coordinate system.

Different motions of the at least one second coordinate system can be induced, such as translation, rotation, etc.

Note that the movement of the second coordinate system is not confined horizontally, but may be arbitrary, up, down, nonlinear, along a curved space (e.g., a cylinder/wheel, or a sphere, to appear rising up from the horizon when moving towards the user).

An example is shown in FIG. 17C, in which a translation of the second coordinate system has been induced with respect to the first coordinate system. As a consequence, all virtual objects 1770, 1780 and 1790 associated with the second coordinate system get closer to the virtual object 1760 associated with the first coordinate system.

This can be used to perform the activity described with reference to FIGS. 10A to 10C, in which the movable coordinate system may be continuously moved towards the user. The user is required to move a ball (e.g., to the left, and right) to avoid a collision with the incoming virtual objects. The movable coordinate system is moved relative to the static coordinate system, such that objects which are attached to the movable coordinate system appear (as displayed on the display device 120) as moving with respect to the viewer, and where some of the objects which are attached to the static coordinate system appear as static.

When new virtual objects appear in the virtual activity world (for example, in FIG. 10C, new virtual bricks can appear to replace the virtual bricks which have passed behind the user), a new movable coordinate system can be generated for these virtual objects.

Note that the method of FIG. 17A is not limitative, and it is possible to generate moving virtual objects using various methods. In some embodiments, all virtual objects (both static virtual objects and movable virtual objects) are associated with a common coordinate system of the virtual activity world. The movable virtual objects are associated with parameters which define a speed and a direction within the common coordinate system.

In other embodiments, it is possible to move the world coordinate system with respect to a static coordinate system of the virtual activity world, thereby inducing a motion of the virtual objects with respect to the physical elements associated with the world coordinate system.

Figure 18:
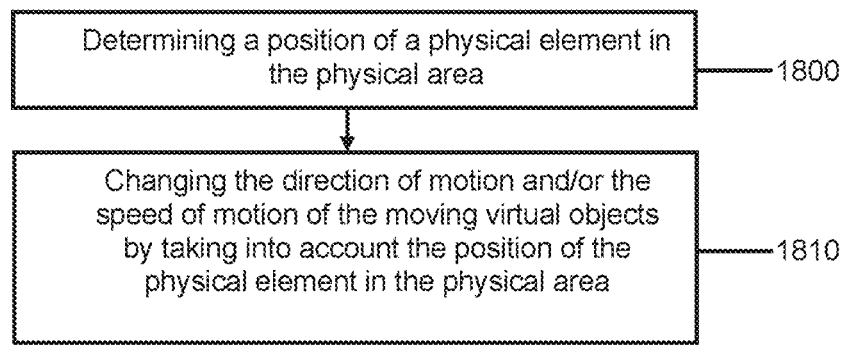
FIG. 18 illustrates a generalized flow-chart of a method of generating a motion in the virtual activity world depending on dynamics of a physical element.

Attention is now drawn to FIG. 18.

The method includes determining (operation 1800) a position of a physical element in the physical area. The physical element can be moved by a user. For example, the physical element is a physical ball or a body part.

The method further includes changing (operation 1810) the direction of motion and/or the speed of motion of the moving virtual objects by taking into account the position of the physical element in the physical area.

In some embodiments, operation 1810 can include moving the second (moveable) coordinate system by taking into account the position of the physical element in the physical area.

As an example, the user may move the ball forward in the physical area and the second coordinate system may move faster in the direction of the player. Conversely, moving the ball back could slow down the motion of the moving coordinate system. These examples are not limitative.

Figure 19A:
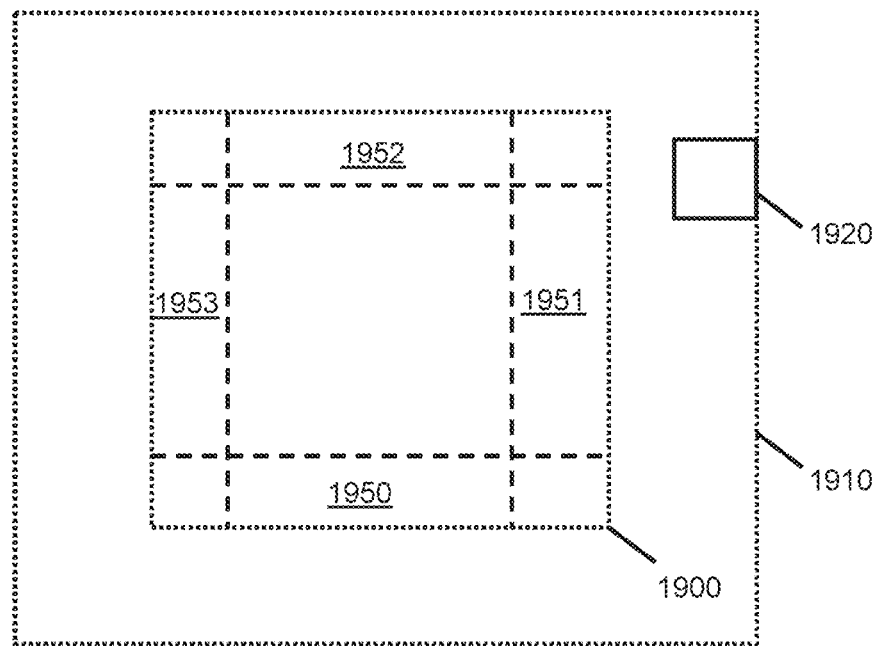
FIGS. 19A and 19B illustrate examples of moving the virtual activity world with respect to an active area informative of the physical area in which the user is performing an activity.
Figure 19B:
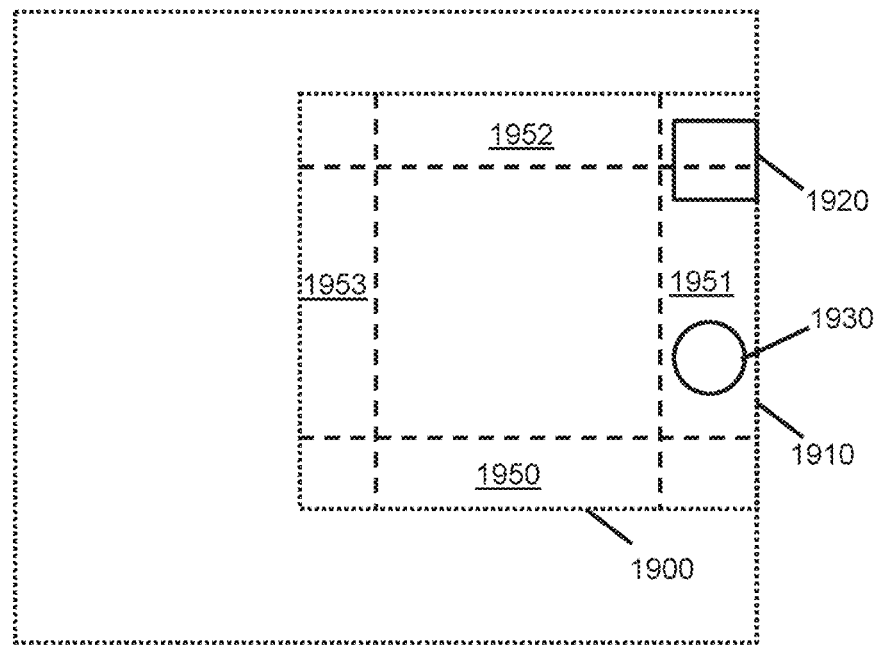
Figure 19C:
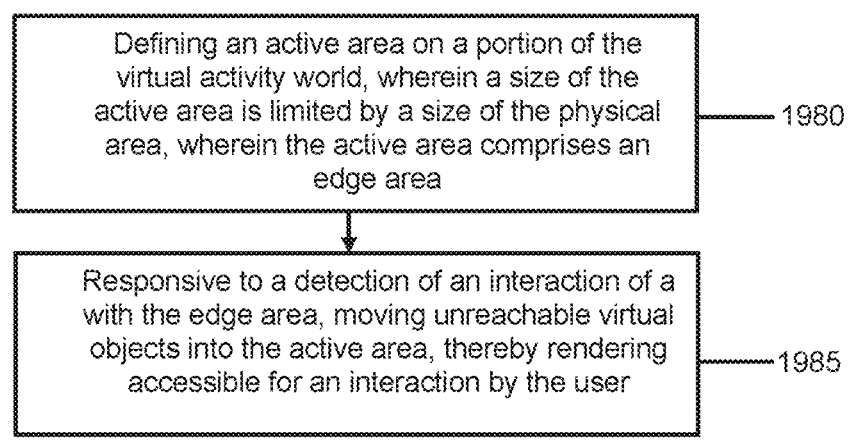
FIG. 19C illustrates a generalized flow-chart of a method of moving the virtual activity world with respect to an active area informative of the physical area in which the user is performing an activity.

Attention is now drawn to FIGS. 19A to 19C.

Assume that the physical area (or a fraction thereof) in which the user performs the activity (e.g., a room, or a fraction thereof) is mapped (operation 1980 in FIG. 19C) to an active area 1900 in the virtual activity world 1910. As already mentioned above, the size of the active area 1900 is limited by a size of the physical area. In some embodiments, the active area 1900 is centred with respect to the virtual activity world 1910.

The active area 1900 may define the position/mapping of the physical area within the virtual activity world, and in turn, sets which part of the virtual activity world is visible by the user (this corresponds to the interior of the active area) and which part of the virtual activity world is not visible by the user (or with a limited view).

Assume that the active area 1900 is defined as a limited portion/fraction of the virtual activity world 1910.

When the user moves a physical element within the physical area, this induces a motion of the physical element in the active area 1900 (the user may view the motion of the physical object on the images displayed on the display device 120). Since the physical area has a limited size, the user cannot interact with objects (in particular virtual objects) of the virtual activity world which are located outside of the active area 1900. In the example of FIG. 19A, the user cannot interact with virtual object 1920.

According to some embodiments, it is possible to define (operation 1980) one or more edge areas within the active area 1900. An edge area corresponds to an area which is closer to the external boundaries/borders of the active area 1900 than to the centre of the active area. A border of the area defines the perimeter of the active area (virtual objects located within the active area are reachable by the user, which can interact with them, whereas virtual objects located outside of the active area are not reachable by the user, and the user cannot interact with them).

The user can view the active area 1900, which is displayed on the display device 120 (that is to say the virtual objects located in the active area, and the images of the physical area on which the virtual objects present in the active area are superimposed). However, the user cannot view (or in a limited manner) the portion of the virtual activity world located out of the active area 1900 on the display device 120.

In some embodiments, the edge area can be in contact with the external boundaries of the active area 1900. Note that the external boundaries of the active area can correspond to physical obstacles of the physical area, such as walls, but this is not limitative. Indeed, the user may define by himself the active area, irrespective of the physical obstacles of the physical area.

In the example of FIG. 19A, four edge areas 1950, 1951, 1952 and 1953 are defined. Note that this number is not limitative.

When the user performs a given interaction in the edge area, this can induce a motion of virtual objects from an initial position outside of the active area, into a new position located in the active area. In particular, the unreachable virtual objects are moved to become closer to the boundaries of the active area, until they reach the interior of the active area.

Since unreachable virtual objects are now located in the active area, this makes these virtual objects accessible for interaction by the user.

Note that the motion can include moving the whole virtual activity world 1910 with respect to the active area 1900.

The interaction (which triggers a displacement of the virtual activity world) can include e.g., moving a physical object (such as a physical ball) into an area of the physical area corresponding/mapped to the edge area of the active area (the edge area can be viewed by the user on the display device 120), or in a zone located at a distance from the edge area which is below a threshold. Alternatively, the interaction can include detecting a presence of the user (or at least of a given body part of the user) in an area of the physical area corresponding/mapped to the edge area of the active area 1900, or in a zone located at a distance from the edge area which is below a threshold.

This can be detected by comparing the position of the physical object, or of the user/body part, as expressed in the coordinate system of the active area, with the position of the edge area(s). If the difference between the positions is below a threshold, this indicates that the physical object and/or the user are located within or close to the edge area(s).

Note that in some embodiments, the position of the virtual counterpart element (which can have different features than the physical element) can be taken into account to determine whether it interacts with the edge area(s), instead of the position of the real physical element (there can be a difference between the two positions, since the size/dimensions of the virtual counterpart element can differ from the actual size/dimensions of the physical element).

An example is shown in FIG. 19B, in which the user has moved the physical ball 1930 in the edge area 1951, located on the right side of the active area 1900. The virtual activity world 1910 is translated along a vector orthogonal to the right border of the active area 1900, towards the active area 1900.

Note that each edge area can be associated with a different direction of motion of the virtual activity world, and/or a different speed of motion of the virtual activity world.

In some embodiments, as long as the user interacts with the edge area, the virtual activity world is progressively moved towards the active area. When the user no longer interacts with the edge area, the virtual activity world stops his motion, and can, in some embodiments, be brought back to its original position relative to the active area. In some embodiments, opposite edge areas of the active area 1900 (for example edge areas 1951 and 1953) induce opposite motions of the virtual activity world 1910. In the example of FIG. 19B, the user may bring back the virtual activity world to its original position by moving the physical ball into the edge area 1953.

According to some embodiments, a plurality of edge areas is defined, each edge area being associated with a different speed of motion of the virtual activity world and/or a different direction of motion of the virtual activity world.

In some embodiments, the motion of the virtual activity world can be progressive (meaning that the user needs to maintain his interaction with the edge area, until the virtual activity world reaches its desired position relative to the active area). In other embodiments, the virtual activity world is directly moved (e.g., translated) to enable the unreachable virtual objects to reach the active area. The user may e.g., provide an input indicative of the virtual objects that he would like to reach, and the virtual activity world is immediately moved according to the required amplitude, so as to enable the unreachable virtual objects to reach the active area.

According to some embodiments, a countdown is started. On start of the countdown, the method can include disabling the capability of moving the virtual activity world. After completion of the countdown, the method can include re-enabling this capability. This ensures that the user does not activate the transformation at close periods of time, causing the virtual object to move repeatedly from one location to the other.

The method as described above can be used in particular in a context in which it is desired to generate a virtual activity world over an area which is larger than the available physical area. Note that the virtual activity world is displayed on the display device 120 of the computerized device 100 and may show virtual objects which are located at a distance, i.e., outside the boundaries of the active area. The above method allows the user to reach such distanced virtual objects by moving towards the edge of the active area, which, in turn, brings the distanced virtual objects closer to the user, to enable interaction.

Figure 20A:
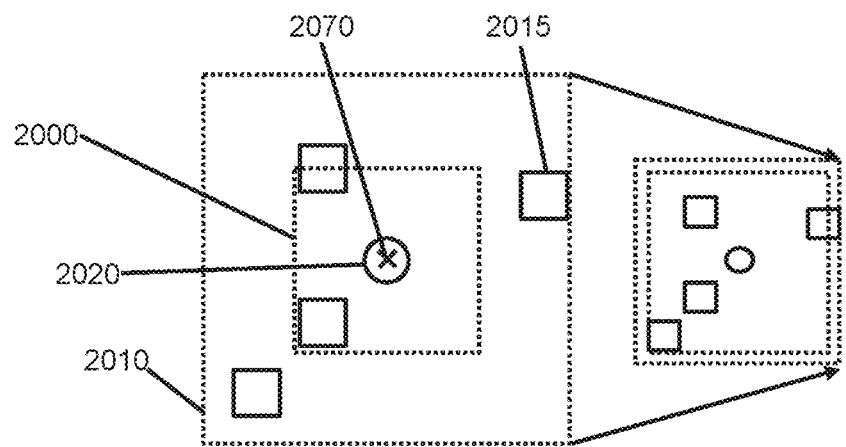
FIGS. 20A and 20B illustrate examples of shrinking/expanding the virtual activity world.
Figure 20B:
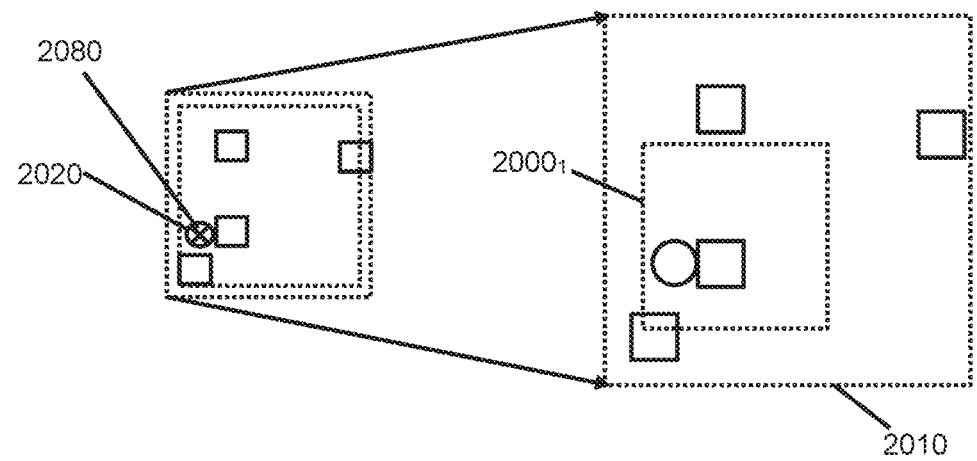
Figure 20C:
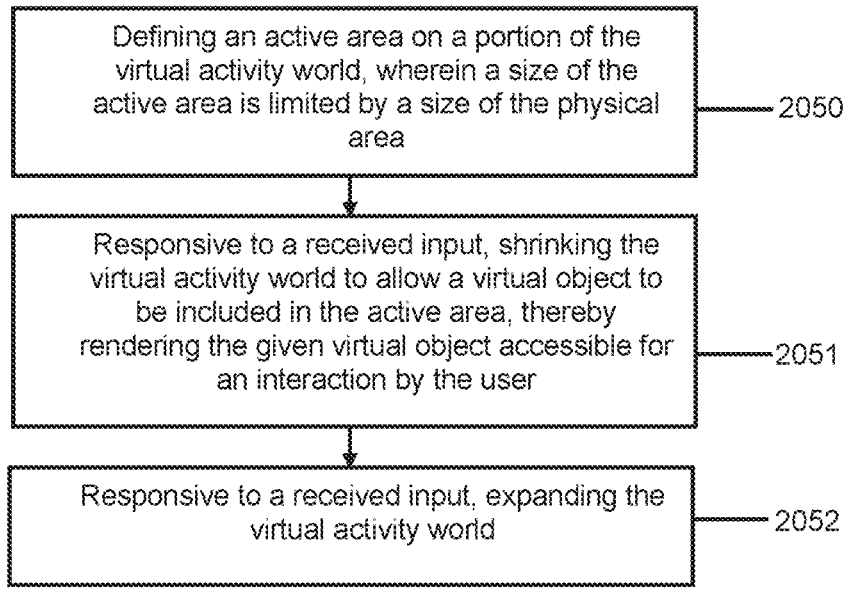
FIG. 20C illustrates a generalized flow-chart of a method of shrinking/expanding the virtual activity world.

Attention is now drawn to FIGS. 20A to 20C.

Similarly to FIGS. 19A to 19C, assume that an active area 2000 is defined (operation 2050 in FIG. 20C) on a limited portion of the virtual activity world 2010. The size of the active area 2000 is limited by a size of the physical area. The user is required to perform the activity in the physical area, and the active area defines the boundaries of the activity.

At least one given virtual object 2015 of the virtual activity world 2000 is located outside of the active area 2000, thereby being inaccessible for interaction by the user. In some embodiments, the virtual elements located outside of the active area 2000 are not displayed on the display device 120 and cannot be viewed by the user, whereas the virtual elements located within the active area 2000 are superimposed on the images of the physical area viewed by user.

Responsive to a received input, a method can include shrinking (operation 2051 in FIG. 20C) the virtual activity world to allow the least one given virtual object 2015 to be included in the active area. This renders the given virtual object 2015 accessible for an interaction by the user. Accordingly, more virtual objects can be fitted within the limited active area corresponding to the physical area.

In addition, the speed at which the user can move within the virtual activity world (after its shrinking) is increased. The user can therefore reach the virtual objects faster.

The received input can include e.g., an input of the user provided to the computerized device 100 (e.g., the user uses the touch screen of his smartphone to generate the input). This can also include detecting a position of the user and/or of the physical object, and if this position is within a predefined area of the active area, this triggers the shrinking process.

Note that the shrinking can be progressive (from an initial size of the virtual activity world in which the given virtual object is outside of the active area, up to a final size of the virtual activity world in which the given virtual object is within the active area) or can be performed in a one-time transformation from the initial size to the final size.

The shrinking (also called zoom-in) is performed around a point (pivot point) which is the centre of the geometrical transformation. In some embodiments, this point can be located at the centre of the active area (and/or of the virtual activity world), but this is not mandatory.

In some embodiments, the shrinking is performed around a centre of the geometrical transformation, according to a predefined (or selected) shrinking factor. Therefore, this transformation impinges most or all of the virtual activity world. The shrinking factor can depend on the unreachable virtual objects that the user wants to include in the active area. If the unreachable virtual object is far from the active area, it is necessary to perform a shrinking with a larger amplitude than for an unreachable virtual object which is closer to the active area.

The centre of the geometrical transformation can be selected by the user (which provides an input to the computerized device 100) or can be selected automatically (based e.g., on predefined rules). For example, the centre of the geometrical transformation can be automatically determined by choosing the current position of the physical element (e.g., the ball, or body part of the user), or other elements.

Note that the shrinking can include shrinking the dimensions of the virtual objects located in the virtual activity world. The shrinking may also include shrinking the dimensions of the virtual objects located within the active area, such as the virtual counterpart object. This enables to keep the correct size ratio between the controlled physical element and the other objects.

In the example of FIG. 20A, the centre of the shrinking (pivot point) of the virtual activity world is located at the centre of the active area 2010 (which coincides with the centre of the virtual activity world 2000). Note that this is not limitative.

As visible in FIG. 20A, before the shrinking process, the user cannot interact with the virtual object 2015. After the shrinking, the virtual object 2015 is now located within the active area 2000 and the user can interact with it.

After shrinking of the virtual activity world, it is possible to expand (operation 2052 in FIG. 20C) the virtual activity world. This can be performed responsive to a received input (e.g., of the user and/or of the system).

The expansion of the virtual activity world can be performed around a different pivot point, different from the first pivot point around which the shrinking has been performed. This is not mandatory.

FIG. 20B illustrates a process of expanding the virtual activity world, back to its original size. Note that the virtual activity world can be expanded to another size, different from its original size.

The method can be used to enable interaction of the user with unreachable virtual objects, but also (or alternatively) to enable a displacement of the active area with respect to the virtual activity world.

This is visible in the sequence of FIGS. 20A and 20B, in which the active area is originally centred with respect to the virtual activity world.

After shrinking and expansion of the virtual activity world, the active area is no longer centred with respect to the virtual activity world and covers another portion thereof.

As a consequence, after the process of shrinking and expansion, a different portion of the virtual activity world can be viewed by the user on the display device 120. In particular, the user can see the images of the physical area, on which virtual elements of the active area (located at its new position relative to the virtual activity world) are overlaid.

Figure 21:
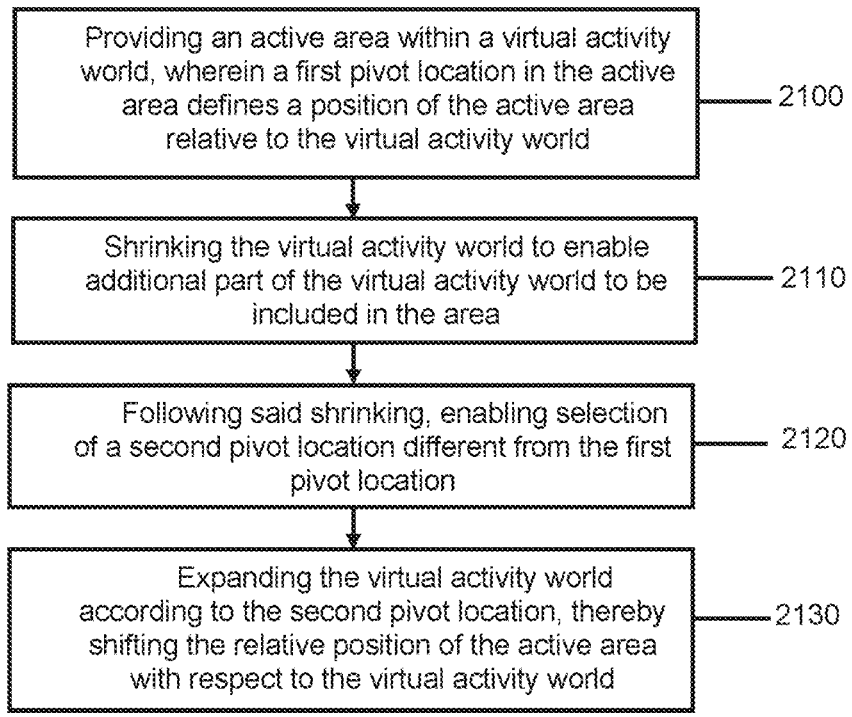
FIG. 21 illustrates a generalized flow-chart of a method of enabling a displacement of an active area (the active area mapping the physical area in which the user is performing the activity to the virtual activity world) within the activity world.

The method of FIG. 21 describes operations that can be performed to shift the position of the active area within the virtual activity world.

Assume that an active area is located within the virtual activity world (operation 2100). Assume that a given point of the active area defines a position of the active area relative to the virtual activity world. For example, assume that the given point is the centre of the active area (this is not limitative and this could be e.g. a corner of the active area, or other points thereof). This given point defines four distances (each distance corresponding to the distance between the given point and a respective external edge/external boundary of the virtual activity world).

In FIG. 20A, before shrinking, the given point is at the centre of the virtual activity world.

In FIG. 20A, the pivot point which is used for performing the shrinking operation has a first pivot location 2070 (see FIG. 20A) which is located in the centre of the virtual activity world.

The virtual activity world can be shrunken (operation 2110) around this first pivot location 2070 as explained above. The user can therefore move the position of the physical element in the virtual activity world after its shrinking.

Following the shrinking, the method can enable (operation 2120) selection of a new location (hereinafter second pivot location) for the pivot point, which is different from the first pivot location (the second pivot location can be selected by a user, or by the system itself).

In the example of FIG. 20B, the second pivot location 2080 has been selected, which has a different position in the virtual activity world than the first pivot location 2070. In this non-limitative example, the second pivot location 2080 coincides with the new position of the ball. Note that this is not limitative and other pivot locations can be used.

Since the virtual activity world has been shrunken, the user is allowed to select (e.g., by interacting with the display device) a second pivot location which has been previously (before shrinking) located outside the boundaries of the active area.

In some embodiments, the user (or a physical object manipulated by the user) can move to a new location within the active area, and the new location can be selected as the second pivot location.

Once the second pivot location has been selected, the virtual activity world is expanded (operation 2130) around the second pivot location, different from the first pivot location.

As a consequence, the relative position of the active area with respect to the virtual activity world is shifted, as visible in the right part of FIG. 20C. In particular, the centre of the active area has been shifted within the virtual activity world, with respect to its previous position.

The user can therefore interact with game elements which are located within the newly selected active area 20001 and which were outside the previous active area. The virtual elements present in the new active area are superimposed on the images of the physical area. Therefore, the user has the sensation that he can play over the entire virtual activity world, although he is located within a limited physical area.

According to some embodiments, interactions (e.g., detection of collision) with virtual objects during shrinking and/or expanding of the virtual activity world are disabled. The zoom-in/zoom out operations enable the user to pause the virtual activity world and move within the virtual world to a new pivot location, and then reactivate the virtual activity world (zoom-out), thereby defining a different active area corresponding to the newly selected pivot location.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A non-transitory computer readable medium comprising instructions that, when executed by one or more processing circuitries, cause the one or more processing circuitries to perform a method comprising:
   obtaining images of a physical area acquired by an imaging device, wherein the physical area comprises a plurality of physical elements, wherein at least one given physical element of the plurality of physical elements is movable by a user performing an activity within the physical area, generating a virtual activity world representative of the physical area, the generating comprising:
  using at least part of the images to map the given physical element to the virtual activity world,
  using at least part of the images to map a surface of a physical element of the physical area to the virtual activity world,
  adding to the virtual activity world one or more virtual objects which overlay the surface in the virtual activity world,
  using the virtual activity world to detect an interaction between:
  the given physical element mapped to the virtual activity world, and
  a given virtual object overlaying the surface in the virtual activity world,
  responsive to a detected interaction, determining an outcome of the interaction, and
  applying a change in the virtual activity world corresponding to the outcome, and
  displaying a representation of the virtual activity world on a display device.

2. The computer readable medium of claim 1, wherein the given physical element is mapped to a virtual counterpart element in the virtual activity world, wherein the method comprises at least one of (i) or (ii):
  (i) determining a change of a position of the given physical element in the physical area, and applying a corresponding change in a position of the virtual counterpart element in the virtual activity world; or
  (ii) displaying the virtual counterpart element as overlaying at least part of the given physical element in the images.

3. The computer readable medium of claim 2, wherein the method comprises generating the virtual counterpart element with one or more features which differ from one or more corresponding features of the given physical element.

4. The computer readable medium of claim 2, wherein the method further comprises at least one of (i) or (ii) or (iii) or (iv) or (v):
  (i) generating a feature of the virtual counterpart element which differs from a feature of the given physical element;
  (ii) changing a feature of the virtual counterpart element depending on an activity to be performed by the user with the given physical element;
  (iii) changing a feature of the virtual counterpart element depending on a level of difficulty of an activity to be performed by the user with the given physical element;
  (iv) generating a feature of the virtual counterpart element which differs from a feature of the given physical element to change a level of difficulty of an activity in which the user is required to make the virtual counterpart element avoid colliding with one or more virtual objects of the virtual activity world;
  (v) generating a feature of the virtual counterpart element which differs from a feature of the given physical element to change a level of difficulty of an activity in which the user is required to make the virtual counterpart element collide with one or more virtual objects of the virtual activity world.

5. The computer readable medium of claim 4, wherein the feature is a size.

6. The computer readable medium of claim 1, wherein the method comprises:
  providing an activity in which the user is required to move the given physical element in the physical area, such that the given physical element mapped to the virtual activity world avoids colliding with one or more virtual objects of the virtual activity world, and
  detecting whether the given physical element mapped to the virtual activity world collides with the one or more virtual objects of the virtual activity world.

7. The computer readable medium of claim 1, wherein the method comprises:
  mapping the given physical element to a virtual counterpart element in the virtual activity world, wherein the virtual counterpart element has a feature which differs from an actual feature of the given physical element, and
  detecting whether the given physical element mapped to the virtual activity world collides with one or more virtual objects of the virtual activity world based on the feature of the virtual counterpart element.

8. The computer readable medium of claim 1, wherein the method comprises:
  using at least part of the images to identify one or more characteristics of the physical element moved by the user in the physical area, and
  providing the user with a given activity according to the one or more characteristics of the physical element moved by the user, the providing including generating a virtual activity world which enables the user to perform the given activity.

9. The computer readable medium of claim 1, wherein the surface of the physical element is a surface of a ground of the physical area, wherein the given physical element is moved by the user on the surface of the ground of the physical area, wherein the method comprises detecting whether the given physical element mapped to the virtual activity world collides with one or more given virtual objects overlaying the surface of the ground in the virtual activity world.

10. The computer readable medium of claim 1, wherein the surface of the physical element is a surface of a ground of the physical area, wherein the given physical element is moved by the user on the surface of the ground of the physical area, wherein the method comprises detecting whether the given physical element mapped to the virtual activity world collides with one or more virtual objects moving towards a position of the imaging device or of the user in the virtual activity world.

11. The computer readable medium of claim 1, wherein the surface of the physical element is a surface of a physical obstacle of the physical area.

12. The computer readable medium of claim 1, wherein the method comprises, responsive to a detection of a collision between the given physical element mapped to the virtual activity world, and one or more given virtual objects overlaying the surface of the physical obstacle in the virtual activity world, performing at least one of (i) or (ii) or (iii):
  (i) generating a motion of one or more virtual objects different from the one or more given virtual objects in the virtual activity world;
  (ii) making the one or more given virtual objects disappear from the virtual activity world;
  (iii) adding to the virtual activity world one or more new virtual objects.

13. The computer readable medium of claim 1, comprising, responsive to a detection of a collision between the given physical element mapped to the virtual activity world, and one or more given virtual objects overlaying the surface of the physical obstacle in the virtual activity world, performing at least one of (i) or (ii):
- (i) generating a motion of one or more virtual objects located above the given virtual objects, wherein the virtual objects appear as falling towards the ground of the physical area;
- (ii) adding to the virtual activity world one or more new virtual objects which appear as falling from the top of the images.

14. The computer readable medium of claim 1, wherein the method comprises, responsive to detection of a collision between the given physical element and the surface of the physical obstacle at a given area, performing at least one of (i) or (ii) or (iii) or (iv):
- (i) inducing a motion of one or more given virtual objects to overlay the given area of the physical obstacle in the virtual activity world;
- (ii) making a virtual object collided by the given physical element to generate an effect;
- (iii) making a virtual object collided by the given physical element to generate an effect which modifies one or more different virtual objects in the virtual activity world;
- (iv) generating at least one new virtual object in the virtual activity world.

15. The computer readable medium of claim 1, comprising, responsive to a detection of a collision between the given physical element mapped to the virtual activity world, and a predefined target area of the surface of the physical obstacle mapped to the virtual activity world, generating at least one new virtual object in the virtual activity world.

16. The computer readable medium of claim 1, wherein the method comprises:
- generating a first coordinate system of the virtual activity world, wherein the given physical element is mapped to the first coordinate system,
- generating at least one second coordinate system of the virtual activity world,
- wherein the at least one second coordinate system is a moveable coordinate system with respect to the first coordinate system, or the first coordinate system is a moveable coordinate system with respect to the at least one second coordinate system;
- generating a relative motion between the at least one second coordinate system and the first coordinate system to move virtual elements associated with the at least one second coordinate system with respect to the first coordinate system.

17. The computer readable medium of claim 1, wherein the method comprises at least one of (i), (ii), (iii), (iv) or (v):
- (i) defining an active area on a portion of the virtual activity world, wherein a size of the active area is limited by a size of the physical area, wherein the active area comprises an edge area, wherein at least one given virtual object of the virtual activity world is located outside of the active area, thereby being inaccessible for interaction by the user, responsive to a detection of an interaction of the user with the edge area, moving the given virtual object into the active area, thereby rendering the given virtual object accessible for an interaction by the user;
- (ii) defining an active area on a portion of the virtual activity world, wherein a size of the active area is limited by a size of the physical area, wherein the active area comprises an edge area, wherein at least one given virtual object of the virtual activity world is located outside of the active area, thereby being inaccessible for interaction by a user, responsive to a detection of an interaction of the user with the edge area, moving the active area to a new position relative to the virtual activity world, wherein, at this new position of the active area, the given virtual object is located within the active area, thereby rendering the given virtual object accessible for an interaction by the user;
- (iii) defining an active area on a portion of the virtual activity world, wherein a size of the active area is limited by a size of the physical area, wherein at least one given virtual object of the virtual activity world is located outside of the active area, thereby being inaccessible for interaction by a user, responsive to a received input, shrinking at least part of the virtual activity world to allow the least one virtual object to be included in the active area, thereby rendering the given virtual object accessible for an interaction by the user;
- (iv) performing (iii) and further expanding at least part of the virtual activity world after its shrinking;
- (v) performing (iii) and shrinking the virtual activity world around a first pivot location, wherein the method comprises, following said shrinking, enabling selection of a second pivot location different from the first pivot location, and expanding the virtual activity world around the second pivot location, thereby shifting the relative position of the active area with respect to the virtual activity world.

18. A system comprising a processing circuitry operatively coupled to at least one imaging device, the processing circuitry being operative to:
- obtain images of a physical area acquired by the imaging device, wherein the physical area enables a user to perform an activity involving moving of at least one given physical element,
- generate a virtual activity world representative of the physical area, the generating comprising:
  - using at least part of the images to map the given physical element to the virtual activity world,
  - using at least part of the images to map a surface of a physical element of the physical area to the virtual activity world,
  - adding to the virtual activity world one or more virtual objects which overlay the surface in the virtual activity world,
  - use the virtual activity world to detect an interaction between:
- the given physical element mapped to the virtual activity world, and
- a given virtual object overlaying the surface in the virtual activity world,
  - responsive to a detected interaction, determine an outcome of the interaction, and apply a change in the virtual activity world corresponding to the outcome, and
- display a representation of the virtual activity world on a display device.

19. A non-transitory computer readable medium comprising instructions that, when executed by one or more processing circuitries, cause the one or more processing circuitries to perform a method comprising:
- obtaining images of a physical area acquired by an imaging device, wherein the physical area comprises a plurality of physical elements, wherein at least one given physical element of the plurality of physical elements is movable by a user performing an activity within the physical area, generating a virtual activity world representative of the physical area, the generating comprising:
using at least part of the images to map physical elements of the plurality of physical elements, to the virtual activity world, wherein the physical elements include the given physical element, wherein the given physical element is mapped to a virtual counterpart element in the virtual activity world,
generating the virtual counterpart element with one or more features which differ from one or more corresponding features of the given physical element, and adding one or more virtual objects to the virtual activity world,
using the virtual activity world to detect an interaction between:
the given physical element mapped to the virtual activity world, and
a given virtual object,
responsive to a detected interaction, determining an outcome of the interaction, and applying a change in the virtual activity world corresponding to the outcome, and
displaying a representation of the virtual activity world on a display device.

20. The computer readable medium of claim 19, wherein the method further comprises at least one of (i) or (ii) or (iii) or (iv) or (v):
(i) generating a feature of the virtual counterpart element which differs from a feature of the given physical element;
(ii) changing a feature of the virtual counterpart element depending on an activity to be performed by the user with the given physical element;
(iii) changing a feature of the virtual counterpart element depending on a level of difficulty of an activity to be performed by the user with the given physical element;
(iv) generating a feature of the virtual counterpart element which differs from a feature of the given physical element to change a level of difficulty of an activity in which the user is required to make the virtual counterpart element avoid colliding with one or more virtual objects of the virtual activity world;
(v) generating a feature of the virtual counterpart element which differs from a feature of the given physical element to change a level of difficulty of an activity in which the user is required to make the virtual counterpart element collide with one or more virtual objects of the virtual activity world.

\* \* \* \* \*